United States Patent
Najafi Shoushtari et al.

(10) Patent No.: US 10,698,481 B1
(45) Date of Patent: Jun. 30, 2020

(54) GLINT-ASSISTED GAZE TRACKER

(71) Applicant: Apple Inc., Cupertino, CA (US)

(72) Inventors: Seyed Hesameddin Najafi Shoushtari, San Francisco, CA (US); Kuen-Han Lin, Mountain View, CA (US); Yanghai Tsin, Palo Alto, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/143,071

(22) Filed: Sep. 26, 2018

Related U.S. Application Data

(60) Provisional application No. 62/564,985, filed on Sep. 28, 2017.

(51) Int. Cl.
| | |
|---|---|
| *G06F 3/01* | (2006.01) |
| *G06K 9/46* | (2006.01) |
| *G06T 19/00* | (2011.01) |
| *G06K 9/00* | (2006.01) |

(52) U.S. Cl.
CPC .......... *G06F 3/013* (2013.01); *G06K 9/0061* (2013.01); *G06K 9/00617* (2013.01); *G06K 9/4604* (2013.01); *G06T 19/006* (2013.01)

(58) Field of Classification Search
CPC . G06F 3/013; G06F 3/011; G06F 3/01; G06F 3/00; G06K 9/0061; G06K 9/0617; G06K 9/4604; G06K 9/00617; G06K 9/00597; G06K 9/46; G06K 9/36; G06K 9/00362; G06K 9/00; G06T 19/006; G06T 19/00
See application file for complete search history.

(56) References Cited

U.S. PATENT DOCUMENTS

| | | | | |
|---|---|---|---|---|
| 8,457,352 | B2* | 6/2013 | Hennessey | A61B 3/113 |
| | | | | 382/103 |
| 8,971,570 | B1* | 3/2015 | Raffle | G06F 3/013 |
| | | | | 382/103 |
| 9,916,005 | B2 | 3/2018 | Aronsson | |
| 9,928,654 | B2* | 3/2018 | Miller | G06F 3/011 |
| 9,983,666 | B2* | 5/2018 | Lankford | G06F 3/013 |
| 10,417,784 | B1* | 9/2019 | Cavin | G06F 3/013 |

(Continued)

OTHER PUBLICATIONS

Zhu et al, "Novel Eye Gaze Tracking Techniques Under Natural Head Movement", IEEE Transactions on Biomedical Engineering, vol. 54, No. 12, Dec. 2007, pp. 2246-2260. (Year: 2007).*

(Continued)

*Primary Examiner* — Julie Anne Watko
(74) *Attorney, Agent, or Firm* — Robert C. Kowert; Kowert, Hood, Munyon, Rankin & Goetzel, P.C.

(57) ABSTRACT

Methods and apparatus for glint-assisted gaze tracking in a VR/AR head-mounted display (HMD). Images of a user's eyes captured by gaze tracking cameras may be analyzed to detect glints (reflections on the cornea of light sources that illuminate the user's eyes) and the pupil. The glints are matched to particular ones of the light sources. The glint-light source matches are used to determine the cornea center of the eye, and the pupil center is determined. The optical axis of the eye is reconstructed from the cornea center and the pupil center, and the visual axis is then reconstructed from the optical axis and a 3D model of the user's eye. The point of gaze on the display is then determined based on the visual axis and a 3D model of the HMD.

20 Claims, 19 Drawing Sheets

(56) References Cited

U.S. PATENT DOCUMENTS

| | | | | |
|---|---|---|---|---|
| 2003/0146901 | A1* | 8/2003 | Ryan | G06F 3/013 345/158 |
| 2013/0328762 | A1* | 12/2013 | McCulloch | G02B 27/017 345/156 |
| 2014/0375790 | A1 | 12/2014 | Robbins et al. | |
| 2016/0116979 | A1 | 4/2016 | Border | |
| 2017/0119298 | A1* | 5/2017 | Cheung | G06F 3/013 |
| 2017/0263006 | A1* | 9/2017 | Hunt | G06T 7/251 |
| 2019/0042842 | A1* | 2/2019 | Cavin | G06K 9/2027 |

OTHER PUBLICATIONS

Morimoto et al, "Detecting Eye Position and Gaze from a Single Camera and 2 Light Sources", 1051-4651/02 (2002) IEEE, pp. 314-317. (Year: 2002).*

Villanueva et al, "A geometric approach to remote eye tracking", Univ. Access Inf Soc (2009) 8:241-257. (Year: 2009).*

Iqbal et al, "Smart User Interface for Mobile Consumer Devices Using Model-Based Eye-Gaze Estimation", IEEE Transactions on Consumer Electronics, Col. 59, No. 1, pp. 161-166, Feb. 2013. (Year: 2013).*

Changyuan et al, "The line of sight to estimate method based on stereo vision", Multimed Tooks Appl (2016) 75-12123-12136. (Year: 2016).*

Plopski et al, "Corneal-Imaging Calibration for Optical See-Through Head-Mounted Displays", IEEE Transactions on Visualization and Computer Graphics, Apr. 2015, v. 21, No. 4, pp. 481-490. (Year: 2015).*

Gneo et al, "A free geometry model-independent neural eye-gaze tracking system", Journal of Neuro Engineering and Rehabilitation 2012, 9:82, pp. 1-15. (Year: 2012).*

* cited by examiner

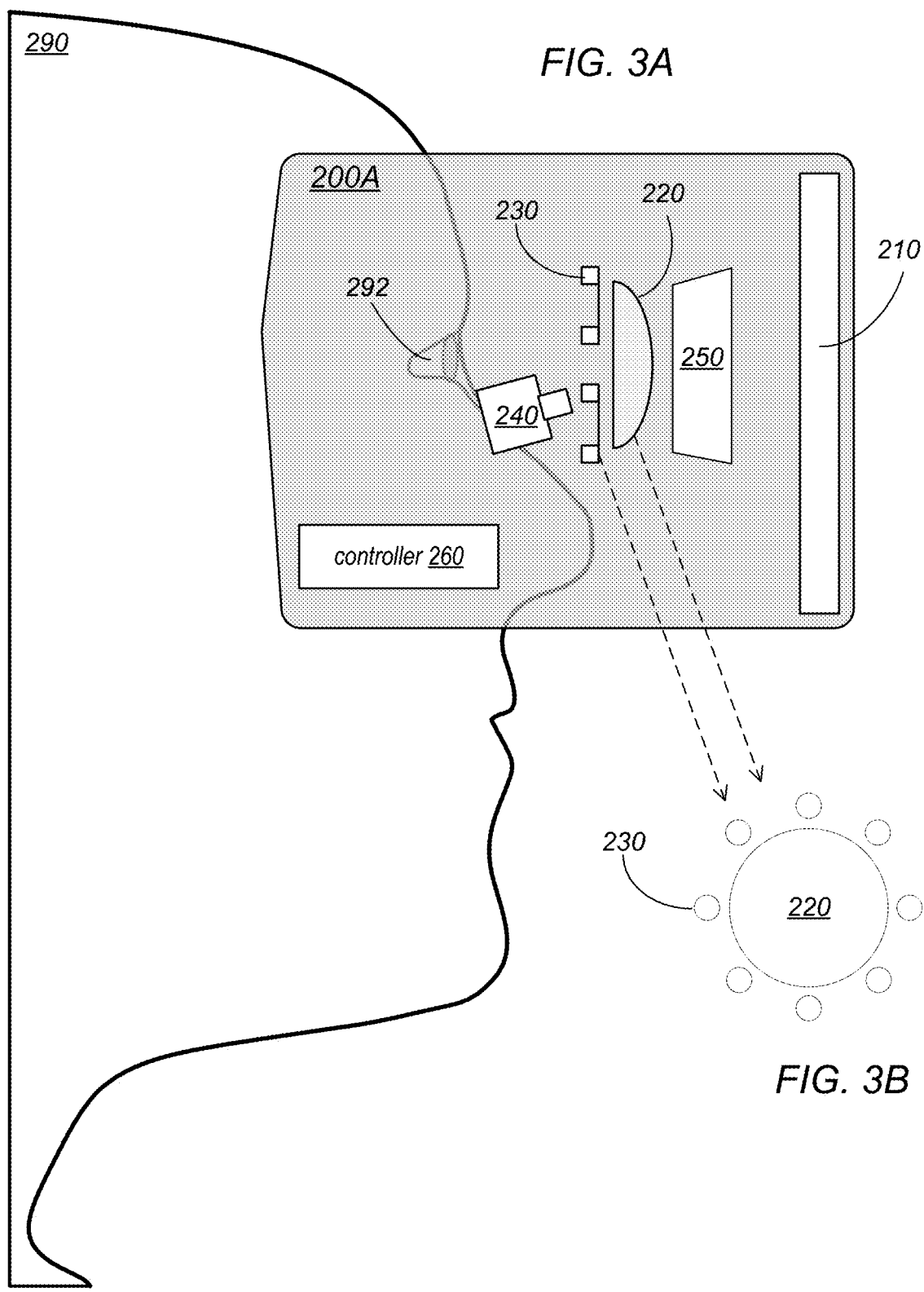

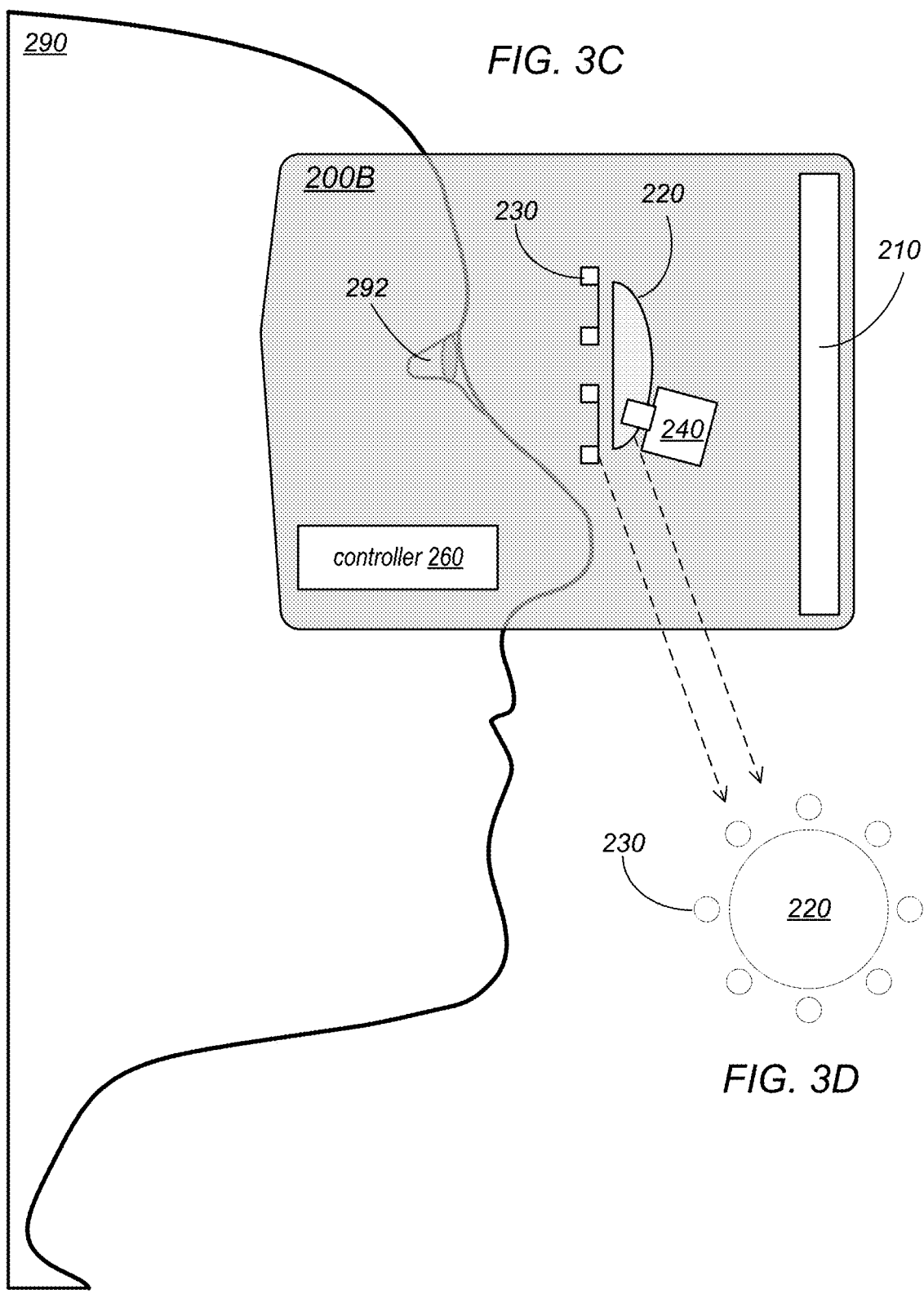

GLINT-ASSISTED GAZE TRACKER

PRIORITY INFORMATION

This application claims benefit of priority of U.S. Provisional Application Ser. No. 62/564,985 entitled "GLINT-ASSISTED GAZE TRACKER" filed Sep. 28, 2017, the content of which is incorporated by reference herein in its entirety.

BACKGROUND

Virtual reality (VR) allows users to experience and/or interact with an immersive artificial environment, such that the user feels as if they were physically in that environment. For example, virtual reality systems may display stereoscopic scenes to users in order to create an illusion of depth, and a computer may adjust the scene content in real-time to provide the illusion of the user moving within the scene. When the user views images through a virtual reality system, the user may thus feel as if they are moving within the scenes from a first-person point of view. Similarly, mixed reality (MR) or augmented reality (AR) systems combine computer generated information (referred to as virtual content) with real world images or a real world view to augment, or add content to, a user's view of the world. The simulated environments of VR and/or the mixed environments of MR may thus be utilized to provide an interactive user experience for multiple applications, such as applications that add virtual content to a real-time view of the viewer's environment, interacting with virtual training environments, gaming, remotely controlling drones or other mechanical systems, viewing digital media content, interacting with the Internet, or the like.

SUMMARY

Various embodiments of methods and apparatus for glint-assisted gaze tracking in VR/AR head-mounted displays (HMDs). Images captured by gaze tracking cameras may be input to a glint detection process and a pupil detection process, for example implemented by one or more processors of a controller of the HMD. The glint detection process may detect glints in the images and pass the glint information to the pupil detection process, where the detected glints may be used in detecting the pupil location and contour. The glint information may also be passed by the glint detection process to a glint-LED matching process that matches the detected glints to particular ones of the light-emitting elements of the gaze tracking system. Results of the glint-LED matching process (detected glints and LED correspondences) and pupil detection process (detected pupil ellipse) are passed to a gaze estimation process, for example implemented by one or more processors of the controller, to estimate the user's point of gaze.

In the gaze estimation process, a 3D cornea center estimation process estimates the center of the user's cornea in 3D space based on the detected glints and LED correspondences and user calibration data representing the specific user's eye parameters. A 3D pupil center estimation process estimates the center of the user's pupil in 3D space based on the detected pupil ellipse, the user calibration data, and output of the cornea center estimation process. An optical axis reconstruction process reconstructs the optical axis of the user's eye (the axis connecting the cornea center and the pupil center) in 3D space based on output of the cornea center estimation process and the pupil center estimation process. A visual axis reconstruction process reconstructs the visual axis of the user's eye (the axis connecting the fovea and the cornea center) in 3D space based on output of the optical axis reconstruction process and the user calibration data. A distorted display point estimation process estimates a point on the HMD display (the point of gaze) based on the output of the visual axis reconstruction process and the device-specific HMD calibration data.

BRIEF DESCRIPTION OF THE DRAWINGS

FIGS. 3A, 3B, 3C and 3D show side and front views of example HMDs that implement a gaze tracking system, according to some embodiments.

Figure 1:
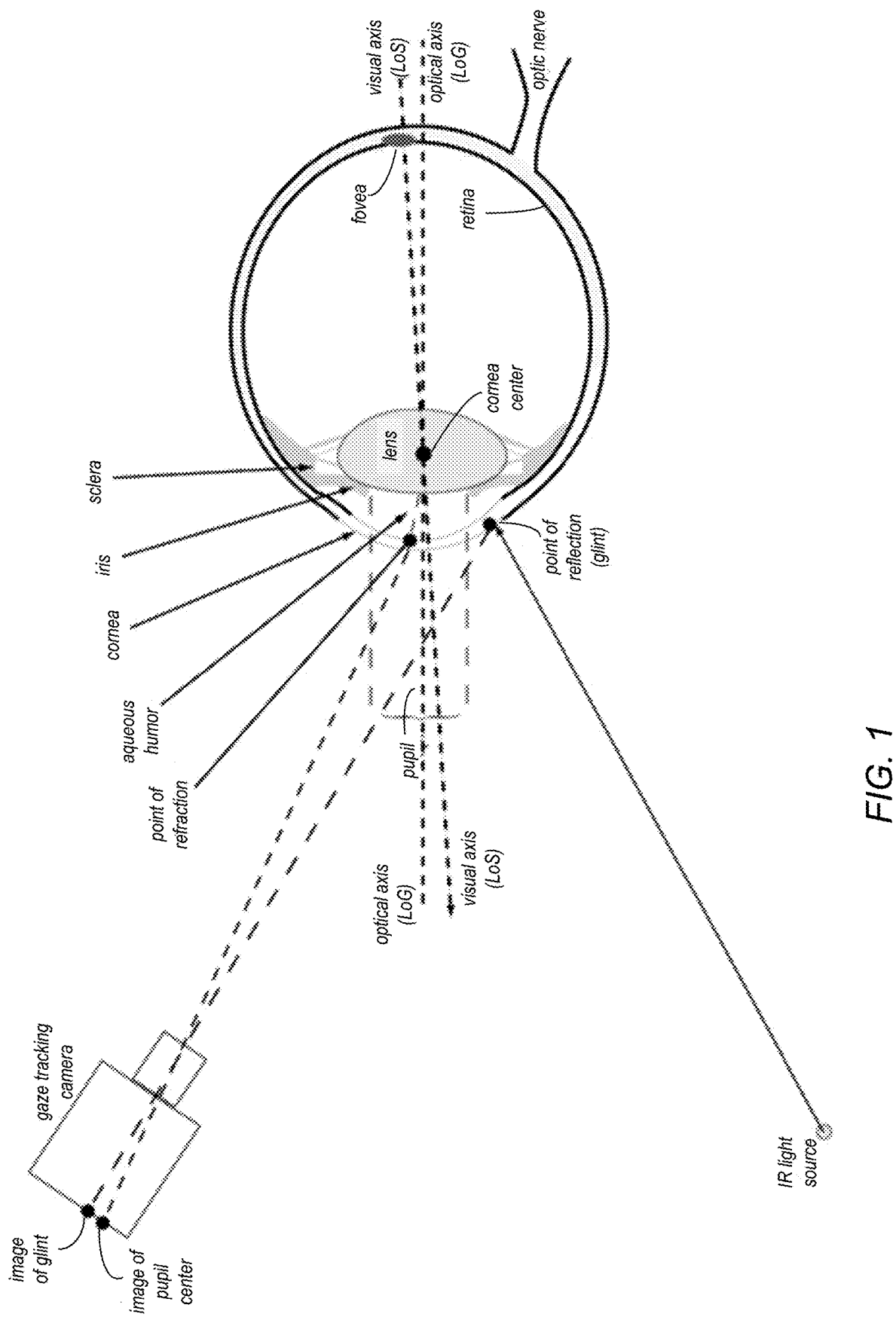
FIG. 1 graphically illustrates a gaze tracking system, according to some embodiments.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the claims, this term does not foreclose additional structure or steps. Consider a claim that recites: "An apparatus comprising one or more processor units . . . ." Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112, paragraph (f), for that unit/circuit/component. Additionally, "configured to" can include generic structure (e.g., generic circuitry) that is manipulated by software or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

"Based On" or "Dependent On." As used herein, these terms are used to describe one or more factors that affect a determination. These terms do not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

"Or." When used in the claims, the term "or" is used as an inclusive or and not as an exclusive or. For example, the phrase "at least one of x, y, or z" means any one of x, y, and z, as well as any combination thereof.

DETAILED DESCRIPTION

Various embodiments of methods and apparatus for gaze tracking in virtual reality (VR) or augmented reality (AR) devices are described. Embodiments of a VR/AR device such as a headset, helmet, goggles, or glasses (referred to herein as a head-mounted display (HMD)) are described that include a display mechanism (e.g., left and right near-eye display panels) for displaying frames including left and right images in front of a user's eyes to thus provide 3D virtual views to the user. The HMD may include left and right optical lenses (referred to herein as eye lenses) located between the display and the user's eyes. For AR applications, the HMD may include or be coupled to one or more external video cameras that capture video of the user's environment for display. The HMD may include a controller component that may, for example, render frames for display to the left and right displays. Alternatively, the controller component may be implemented by an external device that is coupled to the HMD via a wired or wireless connection.

A gaze tracking system is included in the HMD for detecting position and movement of the user's eyes. The gaze tracking system may include at least one eye tracking camera (e.g., infrared (IR) or near-IR (NIR) cameras) positioned at each side of the user's face, and illumination sources (e.g., IR or NIR light sources such as an array or ring of LEDs) that emit light (e.g., IR or NIR light) towards the user's eyes. The eye tracking cameras may be pointed towards the user's eyes to receive reflected IR or NIR light from the light sources directly from the eyes, or alternatively may be pointed towards "hot" mirrors located between the user's eyes and the display panels that reflect IR or NIR light from the eyes to the eye tracking cameras while allowing visible light to pass. The gaze tracking system may capture images of the user's eyes (e.g., as a video stream captured at 60-120 frames per second (fps)), analyze the images to generate gaze tracking information, and communicate the gaze tracking information to the controller component.

The HMD may be calibrated using a device-specific calibration process to determine parameters of the gaze tracking system for the specific HMD, for example the 3D geometric relationship and parameters of the LEDs, cameras, hot mirrors (if present), eye lenses, and display screen. The device-specific calibration process may be performed at the factory or another facility prior to delivery of the HMD to the end user. The device-specific calibration process may an automated calibration process or a manual calibration process. Once a user obtains the HMD, a user-specific calibration process may be applied to estimate the specific user's eye parameters, for example the pupil location, fovea location, optical axis, visual axis, eye spacing, etc. Once the device-specific and user-specific parameters are determined for the HMD, images captured by the eye tracking cameras can be processed using a glint-assisted method to determine the current visual axis and point of gaze of the user with respect to the display. FIG. 1 graphically illustrates a gaze tracking system, according to some embodiments. The gaze tracking system may be used to compute the gaze direction (visual axis) using glints and eye features based on a three-dimensional (3D) geometric model of the eye. The point of gaze (PoG) may be estimated by intersecting the visual axis with the display of the HMD.

Referring to FIG. 1, the images may include glints, which are reflections of the IR or NIR light sources (e.g., arrays of LEDs) on the surface of the cornea. In the glint-assisted method, the images captured by the gaze tracking camera(s) are processed using a glint detection and tracking process to detect and track the glints and by a pupil detection and tracking process to detect and track the pupil. The detected glints may be input to the pupil detection and tracking process to assist in detecting and tracking the pupil location. The detected glints may be matched with corresponding ones of the LEDs. The matched glints and user-specific parameters may be used in estimating the cornea center of the eye in 3D space. The pupil and user-specific parameters may be used to estimate the pupil center in 3D space. By connecting the cornea center and the pupil center, the optical axis of the eye can be reconstructed. The user-specific parameters can then be used to reconstruct the visual axis (the axis connecting the fovea and the cornea center) from the optical axis. The visual axis and device-specific parameters are used to determine the point of gaze on the display of the HMD; the controller can then use this gaze information, for example in rendering frames for display.

While embodiments of a gaze tracking system for HMDs are generally described herein as including at least one eye tracking camera positioned at each side of the user's face to track the gaze of both of the user's eyes, a gaze tracking system for HMDs may also be implemented that includes at least one eye tracking camera positioned at only one side of the user's face to track the gaze of only one of the user's eyes.

Figure 2A:
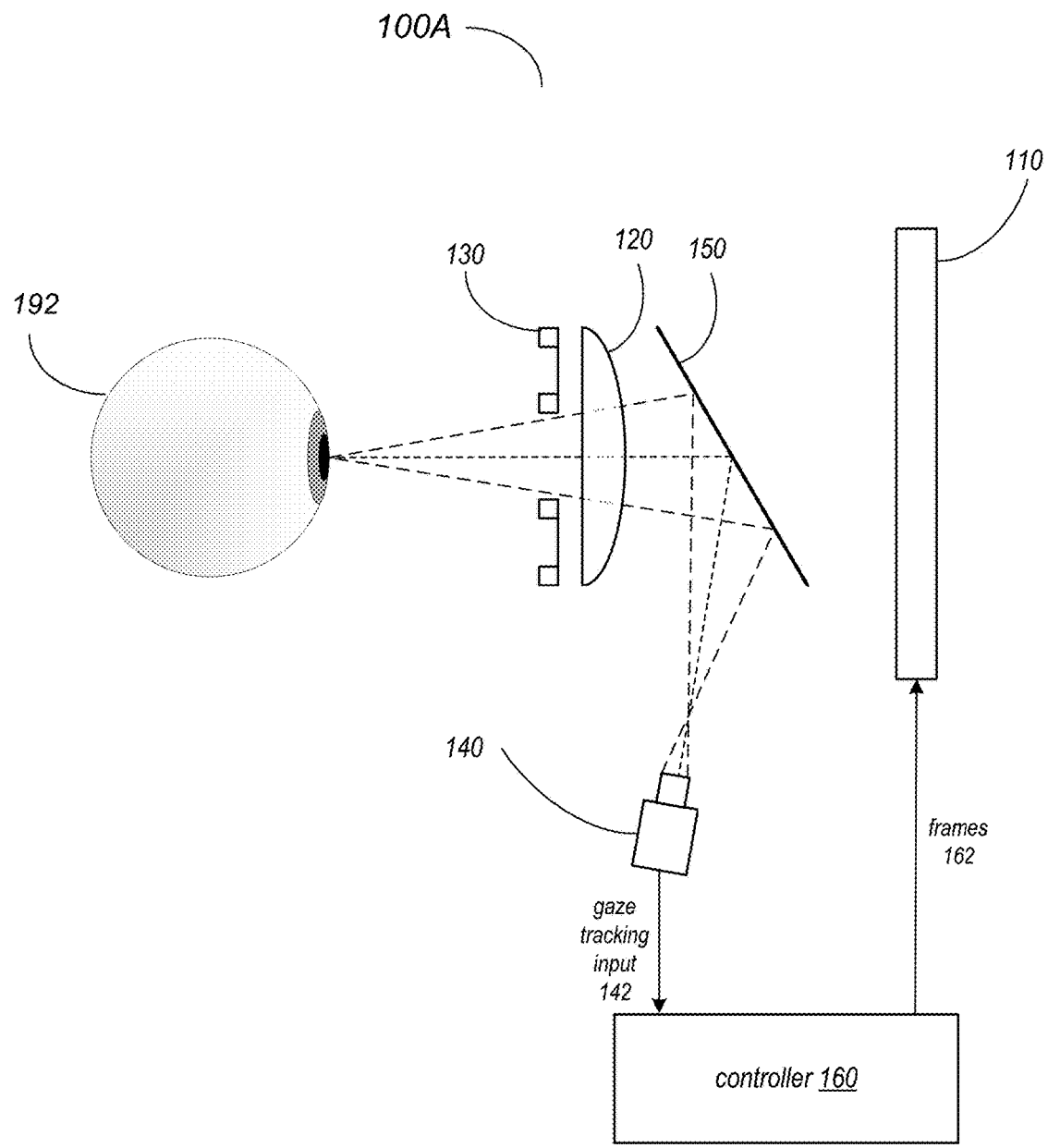
FIGS. 2A and 2B illustrate gaze tracking in a head-mounted display (HMD), according to some embodiments.
Figure 2B:
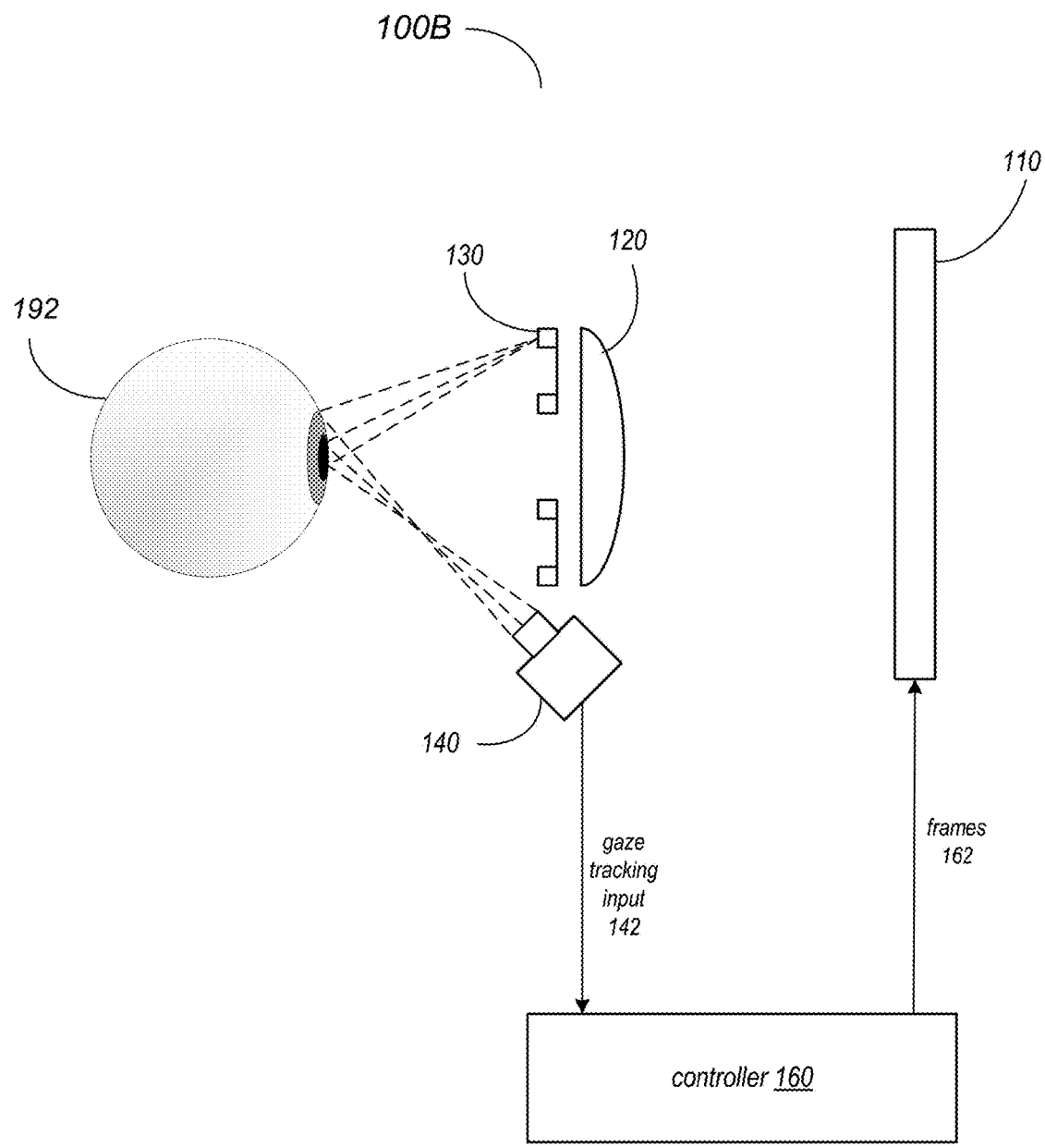

FIGS. 2A and 2B illustrate gaze tracking systems in VR/AR HMDs, according to some embodiments. FIG. 2A illustrates a gaze tracking system in an HMD in which the gaze tracking cameras image a reflection of the user's eyes off of a hot mirror, while FIG. 2B illustrates a gaze tracking system in an HMD in which the gaze tracking cameras image the user's eyes directly.

As illustrated in FIGS. 2A and 2B, an HMD 100A may include, but is not limited to, a display 110 (e.g., a left and right display panel), two eye lenses 120, and a gaze tracking system that includes at least one eye tracking camera 140 (e.g., infrared (IR) or near-IR (NIR) cameras) positioned at each side of the user's face, and an illumination source 130 (e.g., IR or NIR light sources such as an array or ring of NIR light-emitting diodes (LEDs)) that emit light (e.g., IR or NIR light) towards the user's eyes 192. The eye tracking cameras 140 may be pointed towards mirrors 150 located between the user's eyes 192 and the display 110 that reflect IR or NIR light from the eyes 192 while allowing visible light to pass as shown in FIG. 2A, or alternatively may be pointed towards the user's eyes 192 to receive reflected IR or MR light from the eyes 192 as shown in FIG. 2B.

The HMD 100A or 100B may include a controller 160 that may, for example, render AR or VR frames 162 (e.g., left and right frames for left and right display panels) and provide the frames 162 to the display 110. In some embodiments, the controller 160 may be integrated in the HMD. In some embodiments, at least some of the functionality of the controller 160 may be implemented by a device external to the HMD and coupled to the HMD by a wired or wireless connection. The user looks through the eye lenses 120 onto the display 110 (e.g., on to left and right display panels through left and right lenses 120).

The controller 160 may use gaze tracking input 142 from the eye tracking cameras 140 for various purposes, for example in processing the frames 162 for display. The controller 160 may estimate the user's point of gaze on the display 110 based on the gaze tracking input 142 obtained from the eye tracking cameras 140 using the glint-assisted methods described herein. The point of gaze estimated from the gaze tracking input 142 may be used to determine the direction in which the user is currently looking.

The following describes several possible use cases for the user's current gaze direction, and is not intended to be limiting. As an example use case, the controller 160 may render virtual content differently based on the determined direction of the user's gaze. For example, the controller 160 may generate virtual content at a higher resolution in a foveal region determined from the user's current gaze direction than in peripheral regions. As another example, the controller may position or move virtual content in the view based at least in part on the user's current gaze direction. As another example, the controller may display particular virtual content in the view based at least in part on the user's current gaze direction. As another example use case in AR applications, the controller 160 may direct external cameras of the HMD to focus in the determined direction. The autofocus mechanism of the external cameras 150 may then focus on an object or surface in the environment that the user is currently looking at on the display 110. As another example use case, the eye lenses 120 may be focusable lenses, and the HMD may use the gaze tracking information to adjust the focus of the eye lenses 120 so that the virtual object that the user is currently looking at has the proper vergence to match the convergence of the user's eyes 192. The controller 160 may leverage the gaze tracking information to direct the eye lenses 120 to adjust focus so that close objects that the user is looking at appear at the right distance.

FIGS. 3A and 3C show side views of example HMDs 200A and 200B that implement a gaze tracking system as illustrated in FIGS. 2A and 2B, respectively, according to some embodiments. FIGS. 3B and 3D illustrate front views of example light sources 230 and lenses 220. Note that HMDs 200A and 200B as illustrated in FIGS. 3A and 3C are given by way of example, and are not intended to be limiting. In various embodiments, the shape, size, and other features of an HMD 200 may differ, and the locations, numbers, types, and other features of the components of an HMD 200 may vary.

HMDs 200A and 200B may include a display 210, two eye lenses 220, eye tracking cameras 240, and light sources 230 (e.g., IR or NIR LEDs), mounted in a wearable housing. Light sources 230 emit light (e.g., IR or NIR light) towards the user's eyes 292. In some embodiments, the light sources 230 may be arranged in rings or circles around each of the lenses 220 as shown in FIGS. 3B and 3D. 3B and 3D show eight light sources 230 (e.g., LEDs) arranged around each lens 220 as an example. However, more or fewer light sources 230 may be used, and other arrangements and locations of light sources 230 may be used. The eye tracking cameras 240 may be pointed towards mirrors 250 located between the user's eyes 292 and the display 210 that reflect IR or NIR light from the eyes 292 while allowing visible light to pass as shown in FIG. 3A, or alternatively may be pointed towards the user's eyes 292 to receive reflected IR or NIR light from the eyes 292 as shown in FIG. 3C.

HMDs 200A and 200B may include or be coupled to a controller 260. For AR applications, an HMD 200 may include one or more external cameras (not shown); the controller 260 may receive video from the external cameras, render frames (e.g., left and right frames for left and right display panels) based at least in part on the video, and provide the frames to the display 210. For VR applications, the controller 260 may receive virtual content from one or more sources, render frames (e.g., left and right frames for left and right display panels) based at least in part on the virtual content, and provide the frames to the display 210.

An HMD 200A or 200B may be positioned on the user 290's head such that the display 210 and eye lenses 220 are disposed in front of the user 290's eyes 292. The eye tracking cameras 240 may be used to track position and movement of the user 290's eyes. Arrays of IR or NIR light source(s) 230 may be positioned in the HMD 200 (e.g., around the eye lenses 220, or elsewhere in the HMD 200) to illuminate the user's eyes 292 with IR or NIR light. In some embodiments, the light sources 230 may be arranged in rings or circles around each of the lenses 220 as shown in 3B and 3D. 3B and 3D show eight light sources 230 (e.g., LEDs) arranged around each lens 220 as an example. However, more or fewer light sources 230 may be used, and other arrangements and locations of light sources 230 may be used. The eye tracking cameras 240 receive a portion of IR or NIR light reflected off of one or more mirrors as shown in FIG. 3A or directly from the eyes 292 as shown in FIG. 3C. In some embodiments, the display 210 emits light in the visible light range and does not emit light in the IR or NIR range, and thus does not introduce noise in the gaze tracking system. Note that the location and angle of eye tracking cameras 240 is given by way of example, and is not intended to be limiting. While FIGS. 3A and 3C show a single eye tracking camera 240 located on each side of the user 290's face, in some embodiments there may be two or more NIR cameras 240 on each side of the user 290's face. For example, in some embodiments, a camera 240 with a wider field of view (FOV) and a camera 240 with a narrower FOV may be used on each side of the user's face. As another example, in some embodiments, a camera 240 that operates at one wavelength (e.g. 850 nm) and a camera 240 that operates at a different wavelength (e.g. 940 nm) may be used on each side of the user's face.

Embodiments of the HMD 200 with a gaze tracking system as illustrated in FIGS. 3A and 3C may, for example, be used in augmented or mixed reality (AR) applications to provide augmented or mixed reality views to the user 290. Embodiments of the HMD 200 with a gaze tracking system as illustrated in FIGS. 3A and 3C may also be used in virtual reality (VR) applications to provide VR views to the user 290. In these embodiments, the controller 260 of the HMD 200 may render or obtain virtual reality (VR) frames that include virtual content, and the rendered frames may be provided to the projection system of the HMD 200 for display on display 210.

Figure 14:
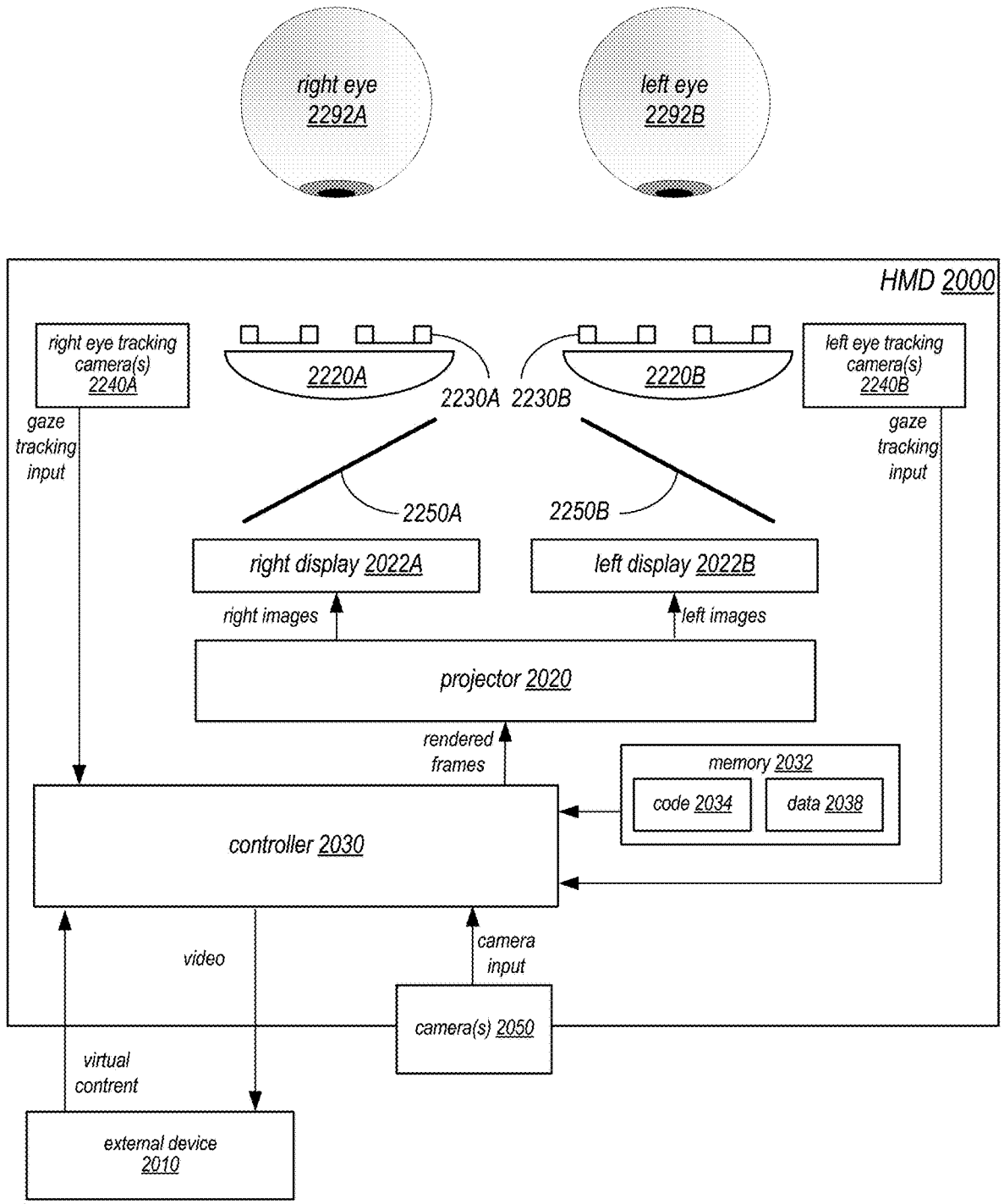
FIG. 14 is a block diagram illustrating components of an example VR/AR system that includes a gaze tracking system, according to some embodiments.

The controller 260 may be implemented in the HMD 200, or alternatively may be implemented at least in part by an external device (e.g., a computing system) that is communicatively coupled to HMD 200 via a wired or wireless interface. The controller 260 may include one or more of various types of processors, image signal processors (ISPs), graphics processing units (GPUs), coder/decoders (codecs), and/or other components for processing and rendering video and/or images. The controller 260 may render frames (each frame including a left and right image) that include virtual content based on inputs obtained from the cameras 250 and/or from one or more external sources, and may provide the frames to a projection system of the HMD 200 for display to display 210. FIG. 14 further illustrates components of an example HMD and VR/AR system, according to some embodiments.

The controller 260 may receive gaze tracking information (e.g., captured images of the user's eyes) from the eye tracking cameras 240 and analyze the information to determine the user 290's current gaze direction or point of gaze on the display 210. The controller 260 may, for example, use the determined point of gaze in rendering content to be displayed on the display. As another example use case, for AR applications, the controller 260 may use the gaze tracking information obtained from the gaze tracking system to direct the autofocus mechanism of one or more external cameras to focus in the direction of the user 290's gaze so that the external cameras focus on objects in the environment at which the user 290's is currently looking. As another example use case, for AR or VR applications, the eye lenses 220 may be focusable lenses, and the controller 260 may use the gaze tracking information to adjust the focus of the eye lenses 220 so that the virtual content that the user 290 is currently looking at has the proper vergence to match the convergence of the user 290's eyes 292.

Figure 4:
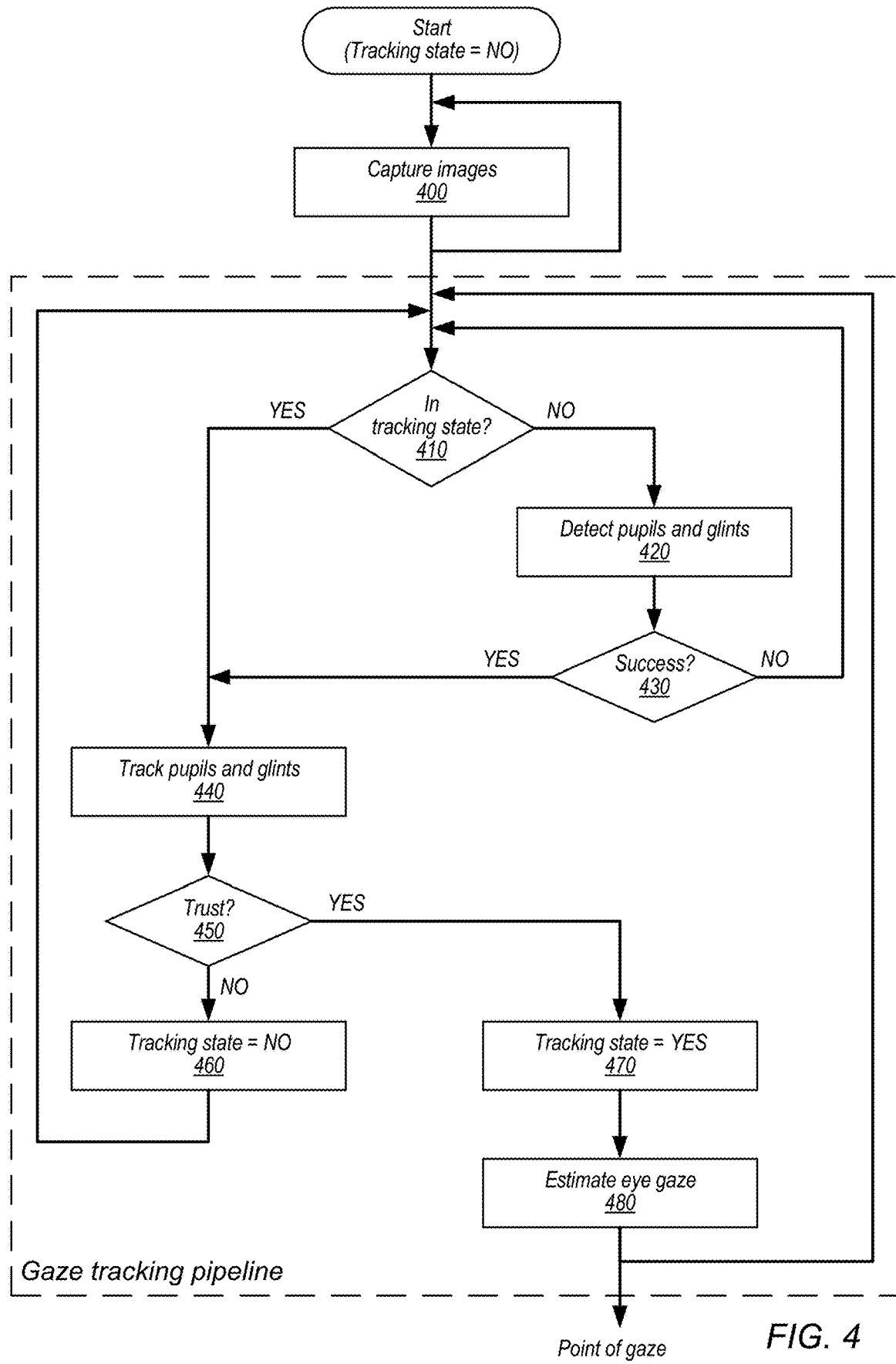
FIG. 4 is a high-level flowchart illustrating a gaze tracking pipeline, according to some embodiments.

FIG. 4 is a high-level flowchart illustrating a gaze tracking pipeline, according to some embodiments. The pipeline of FIG. 4 may, for example, be implemented by a glint-assisted gaze tracing system in VR/AR HMDs as illustrated in FIGS. 2A-2B and 3A-3D. The glint-assisted gaze tracking system may maintain a tracking state. Initially, the tracking state is off or "NO". When in the tracking state, the glint-assisted gaze tracking system uses prior information from the previous frame when analyzing the current frame to track the pupil contour and glints in the current frame. When not in the tracking state, the glint-assisted gaze tracking system attempts to detect the pupil and glints in the current frame and, if successful, initializes the tracking state to "YES" and continues with the next frame in the tracking state.

As indicated at 400, the gaze tracking cameras may capture left and right images of the user's left and right eyes. The captured images are then input to a gaze tracking pipeline for processing beginning at 410. As indicated by the arrow returning to element 400, the gaze tracking system may continue to capture images of the user's eyes, for example at a rate of 60 to 120 frames per second. In some embodiments, each set of captured images may be input to the pipeline for processing. However, in some embodiments or under some conditions, not all captured frames are processed by the pipeline.

At 410, for the current captured images, if the tracking state is YES, then the method proceeds to element 440. At 410, if the tracking state is NO, then as indicated at 420 the images are analyzed to detect the user's pupils and glints in the images, for example using the methods described herein. At 430, if the pupils and glints are successfully detected, then the method proceeds to element 440. Otherwise, the method returns to element 410 to process next images of the user's eyes.

At 440, if proceeding from element 410, the current frames are analyzed to track the pupils and glints based in part on prior information from the previous frames. At 440, if proceeding from element 430, the tracking state is initialized based on the detected pupils and glints in the current frames. Results of processing at element 440 are checked to verify that the results of tracking or detection can be trusted. For example, results may be checked to determine if the pupil and a sufficient number of glints to perform gaze estimation are successfully tracked or detected in the current frames. At 450, if the results cannot be trusted, then the tracking state is set to NO and the method returns to element 410 to process next images of the user's eyes. At 450, if the results are trusted, then the method proceeds to element 470. At 470, the tracking state is set to YES (if not already YES), and the pupil and glint information is passed to element 480 to estimate the user's point of gaze, for example using the methods described herein.

Figure 5A:
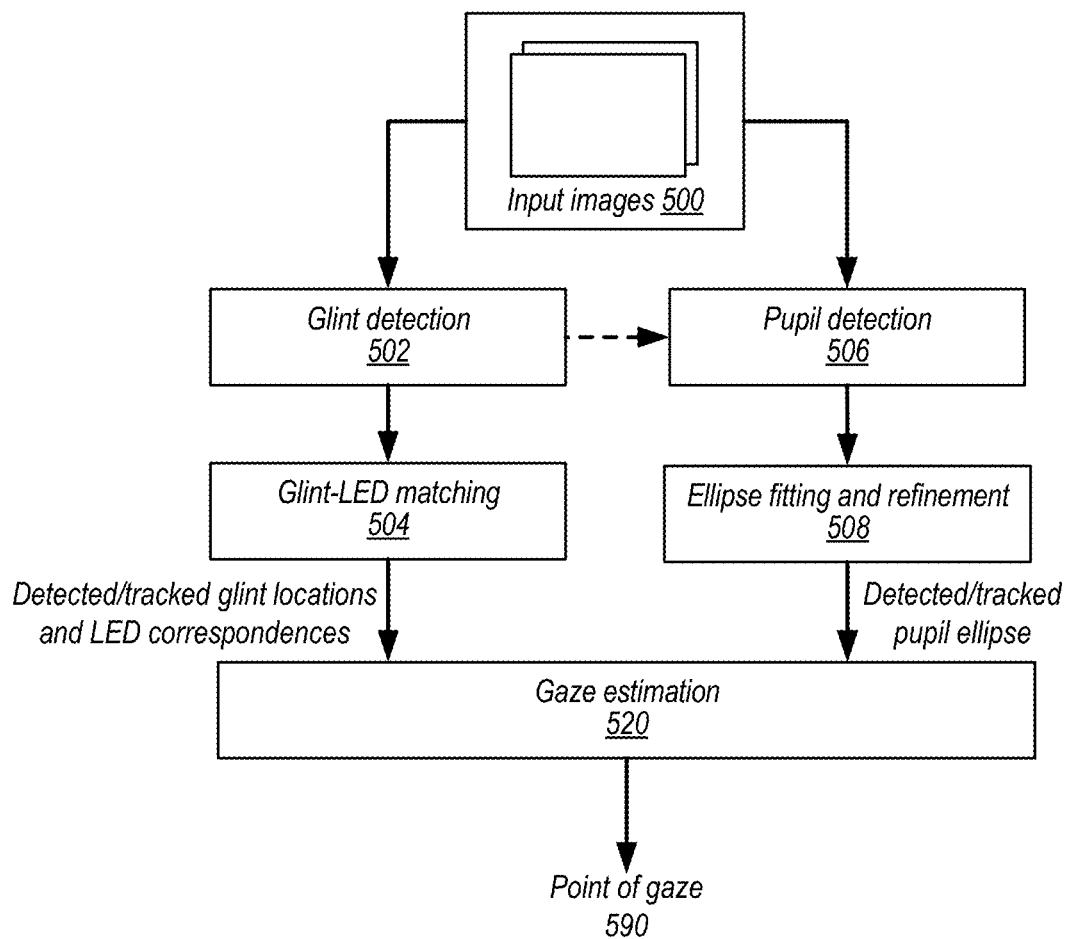
FIGS. 5A and 5B illustrate a glint-assisted gaze tracking system, according to some embodiments.
Figure 5B:
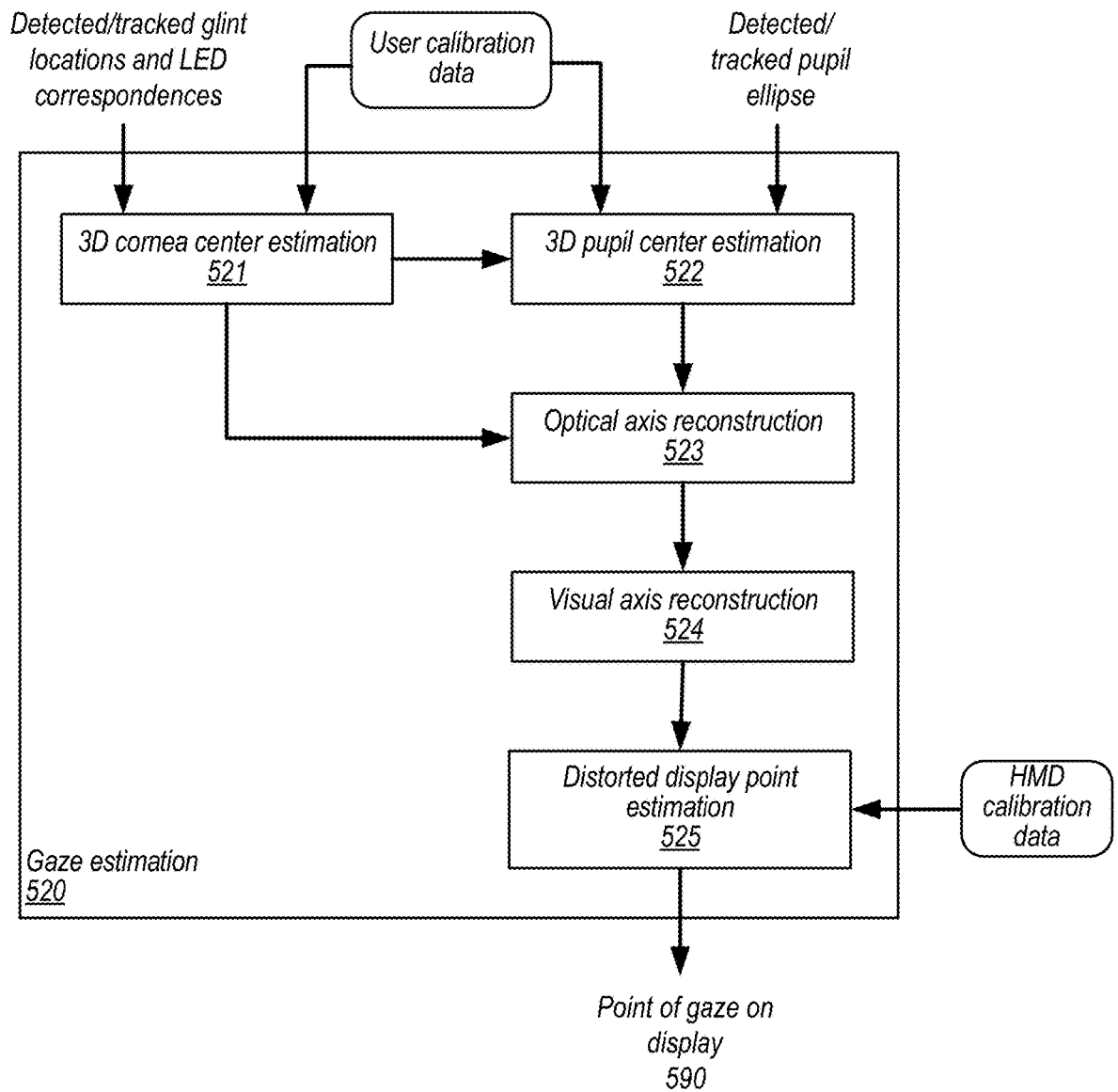

FIGS. 5A and 5B illustrate a glint-assisted gaze tracking system, according to some embodiments. The glint-assisted gaze tracing system of FIGS. 5A and 5B may, for example, be implemented in VR/AR HMDs as illustrated in FIGS. 2A-2B and 3A-3D. FIG. 5A shows the glint-assisted gaze tracking system at a high level, and FIG. 5B shows a gaze estimation component (corresponding to element 480 of FIG. 4) of the glint-assisted gaze tracking system in more detail.

In FIG. 5A, images 500 captured by gaze tracking cameras may be input to a glint detection process 502 and a pupil detection process 506. The glint detection process 502 may detect glints in the images 500 and pass the glint information to the pupil detection process 506, where the detected glints may be used in detecting the pupil location and contour. The glint information may also be passed by glint detection process 502 to a glint-LED matching process 504 that matches the detected glints to particular ones of the light-emitting elements of the gaze tracking system. The pupil detection process 506 may pass pupil information to an ellipse fitting and refinement process 508. Results of glint-LED matching process 504 (detected glints and LED correspondences) and ellipse fitting and refinement process 508 (detected pupil ellipse) are passed to a gaze estimation process 520 to estimate the user's point of gaze 590.

FIG. 5B shows the gaze estimation process 520 in more detail. Referring to FIG. 1, a 3D cornea center estimation process 521 estimates the center of the user's cornea in 3D space based on the detected glints and LED correspondences and user calibration data representing the specific user's eye parameters. FIGS. 12C and 13 graphically illustrate a method for cornea center estimation, according to some embodiments. A 3D pupil center estimation process 522 estimates the center of the user's pupil in 3D space based on the detected pupil ellipse, the user calibration data, and output of the cornea center estimation process 521. FIG. 12B graphically illustrates a method for cornea center estimation, according to some embodiments. An optical axis reconstruction process 523 reconstructs the optical axis of the user's eye (the axis connecting the cornea center and the pupil center) in 3D space based on output of the cornea center estimation process 521 and the pupil center estimation process 522. A visual axis reconstruction process 524 reconstructs the visual axis of the user's eye (the axis connecting the fovea and the cornea center) in 3D space based on output of the optical axis reconstruction process 523 and the user calibration data. A distorted display point estimation process 525 estimates a point on the HMD display (the point of gaze 590) based on the output of the visual axis reconstruction process 524 and the device-specific HMD calibration data.

Figure 6:
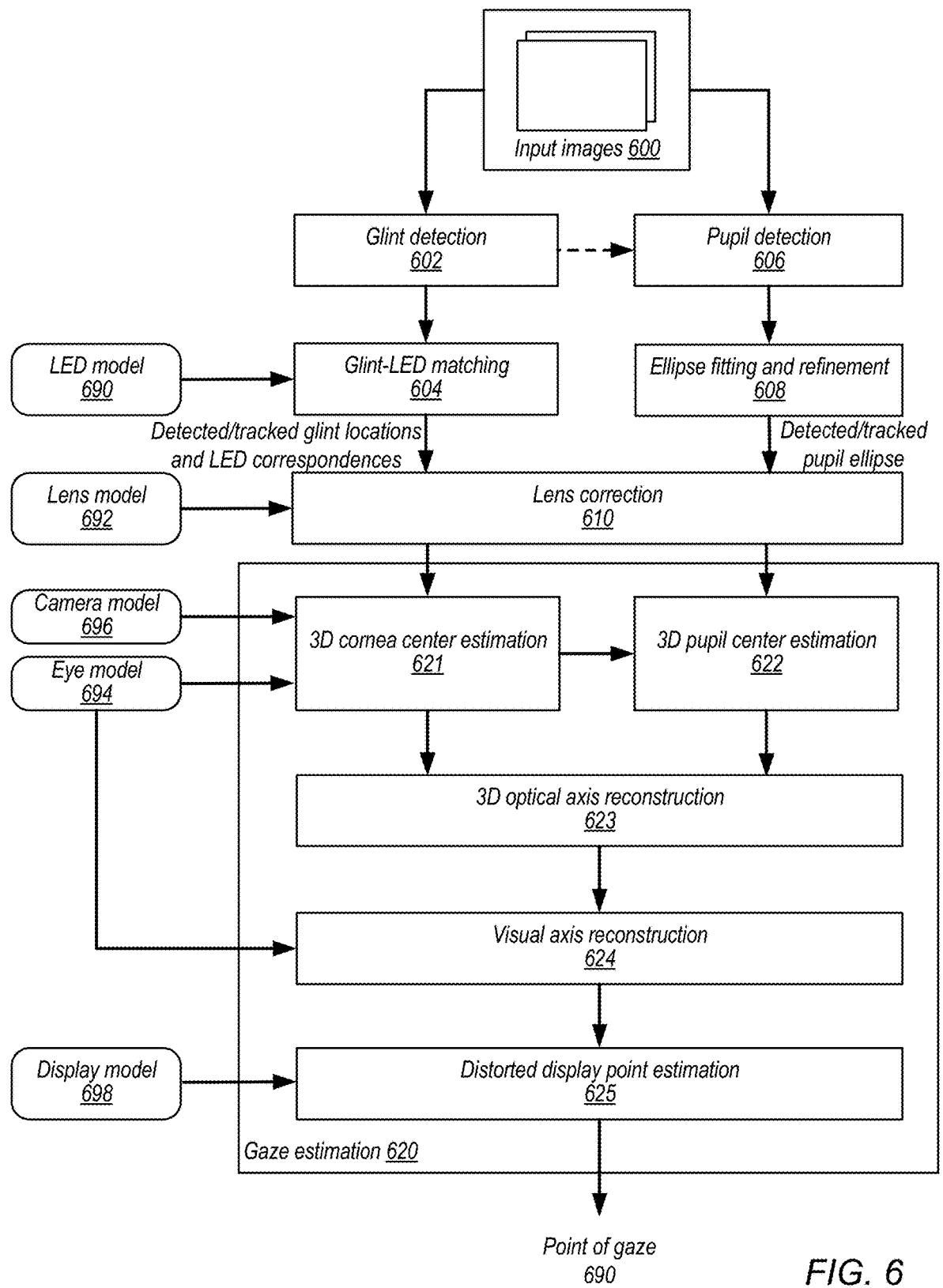
FIG. 6 illustrates components of and inputs to a glint-assisted gaze tracking system in more detail, according to some embodiments.

FIG. 6 illustrates components of and inputs to a glint-assisted gaze tracking system in more detail, according to some embodiments. An HMD may be calibrated using a device-specific calibration process to determine parameters of the gaze tracking system for the specific HMD, for example the 3D geometric relationship an parameters of the LEDs, cameras, hot mirrors (if present), eye lenses, and display screen. The device-specific calibration process may be performed at the factory or another facility prior to delivery of the HMD to the end user. A user-specific calibration process may then be applied to estimate a specific user's eye parameters, for example the pupil location, fovea location, optical axis, visual axis, and eye spacing (distance between the pupils of the two eyes). The calibration data may be used to generate models of the components of the HMD (e.g., LED model 690, lens model 692, camera model 696, and display model 698) and a model of the user's eye (eye model 694).

Once the device-specific and user-specific parameters are determined for the HMD, images captured by the eye tracking cameras can be processed using the glint-assisted gaze tracking system to determine the current visual axis and point of gaze of the user with respect to the display. Images 600 captured by the gaze tracking cameras may be input to a glint detection process 602 and a pupil detection process 606. The glint detection process 602 may detect glints in the images 600 and pass the glint information to the pupil detection process 606, where the detected glints may be used in detecting the pupil location and contour. The glint information may also be passed by glint detection process 602 to a glint-LED matching process 604 that matches the detected glints to particular ones of the light-emitting elements of the gaze tracking system using the LED model 690. The pupil detection process 606 may pass pupil information to an ellipse fitting and refinement process 608. Results of glint-LED matching process 604 (detected glints and LED correspondences) and ellipse fitting and refinement process 608 (detected pupil ellipse) are passed to a lens correction process that corrects the glints and LED correspondences and pupil ellipse according to the lens model 692. The corrected glints and LED correspondences and pupil ellipse are passed to a gaze estimation process 620 to estimate the user's point of gaze 690.

Referring to FIG. 1, a 3D cornea center estimation process 621 estimates the center of the user's cornea in 3D space based on the detected glints and LED correspondences, the eye model 694, and the camera model 696. A 3D pupil center estimation process 622 estimates the center of the user's pupil in 3D space based on the detected pupil ellipse, the eye model 694, the camera model 696, and output of the cornea center estimation process 621. An optical axis reconstruction process 623 reconstructs the optical axis of the user's eye (the axis connecting the cornea center and the pupil center) in 3D space based on output of the cornea center estimation process 621 and the pupil center estimation process 622. A visual axis reconstruction process 624 reconstructs the visual axis of the user's eye (the axis connecting the fovea and the cornea center) in 3D space based on output of the optical axis reconstruction process 623 and the eye model 694. A distorted display point estimation process 625 estimates a point on the HMD display (the point of gaze 690) based on the output of the visual axis reconstruction process 624 and the display model 698.

Figure 8A:
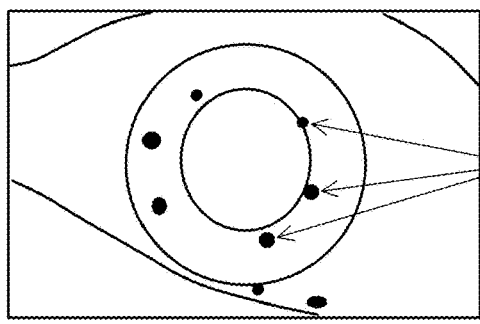
FIGS. 8A and 8B graphically illustrate pupil detection and tracking, according to some embodiments.
Figure 8B:
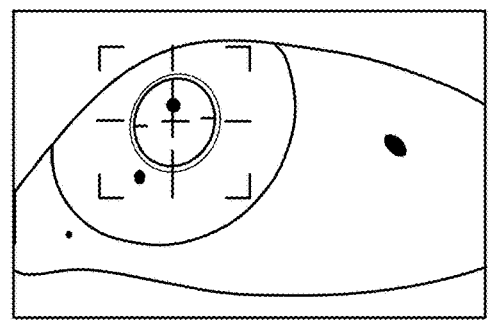

FIGS. 8A and 8B graphically illustrate pupil detection and tracking, according to some embodiments. FIG. 8A shows an example image of a user's eye captured by a gaze tracking camera and input to a pupil detection and tracking process and a glint detection and tracking process as illustrated in FIG. 5A and FIG. 6. Note the glints (reflections of the LEDs off the cornea) around the pupil. In this example, there is an array of six LEDs that emit light towards the user's eyes, resulting in glints (reflections of the LEDs off the cornea surface) as shown in FIG. 8A. As the user's eye moves, the location of the pupil with respect to the glints change. The detected glints may be used by the pupil detection and tracking process to assist in detecting and tracking the pupil location and contour. An ellipse fitting and refinement process may be applied to the detected pupil contour. FIG. 8B illustrates a detected or tracked pupil ellipse according to some embodiments.

Figure 7A:
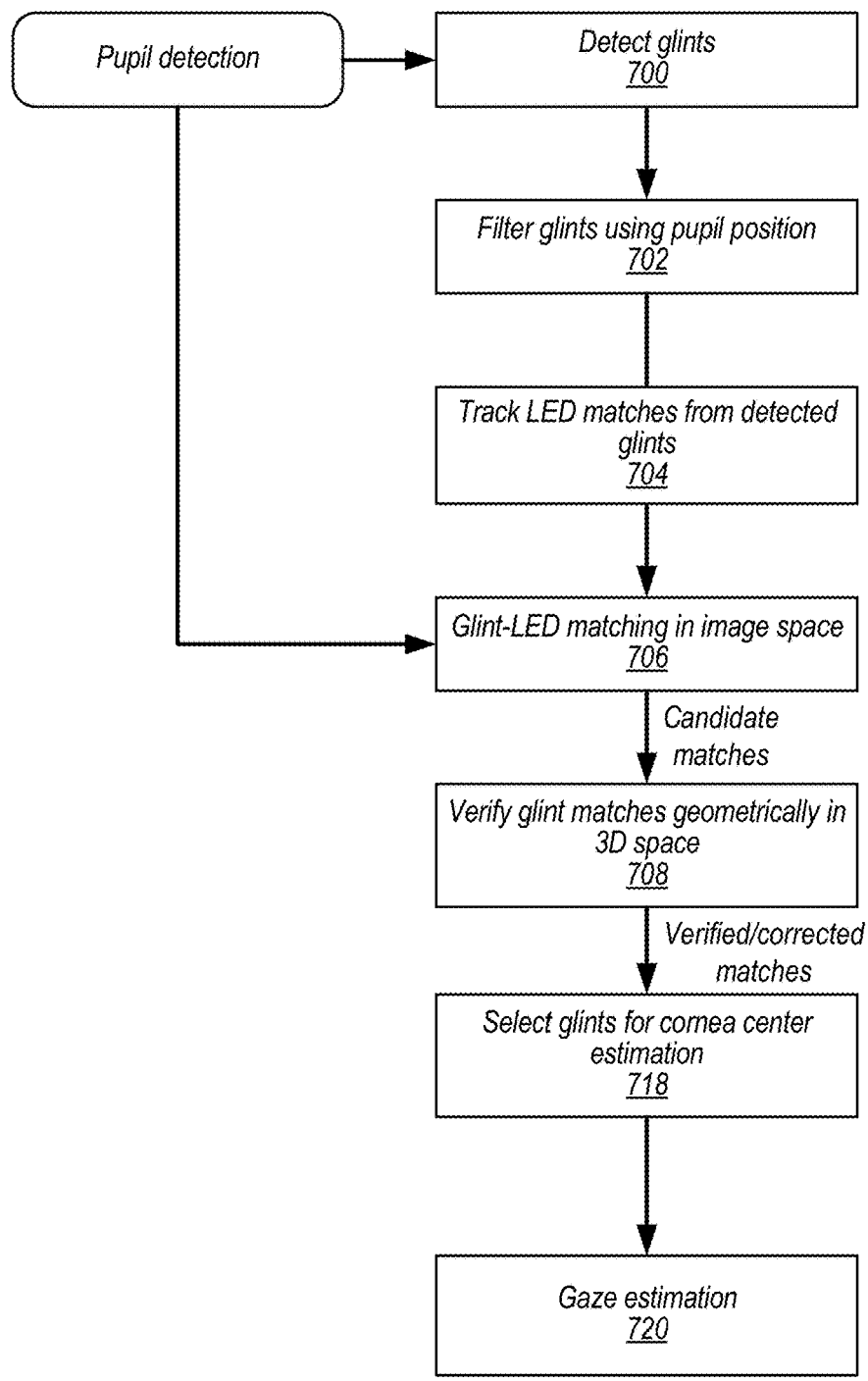
FIG. 7A illustrates a glint-LED matching pipeline, according to some embodiments.

FIG. 7A illustrates a glint-LED matching pipeline, according to some embodiments. The pipeline of FIG. 7A may, for example, be implemented at the glint detection and glint-LED matching components as illustrated in FIG. 5A or FIG. 6. At 700, glints may be detected in an input image of the user's eye captured by a gaze tracking camera. At 702, the detected glints may be filtered using the pupil position as detected by the pupil detection process. For example, in some embodiments, a subset of the glints may be selected based on a threshold distance to the detected pupil (glints that are too far away are rejected).

At 704, LED matches may be assigned to the detected glints using glint-LED matches from the previous frame. In some embodiments, assuming the system is in the tracking state, previous glint-LED matching results may be used to track and match the glints to LEDs at the current frame. The tracking may be performed heuristically in 2D (image space). For at least one glint in the current frame, the tracking method determines a nearest previous glint, and then determines the LED matched to the nearest previous glint; the LED may then be matched to the corresponding glint in the current frame. Thus, tracking 704 passes glint matching information from the previous frame to the current frame.

Figure 9A:
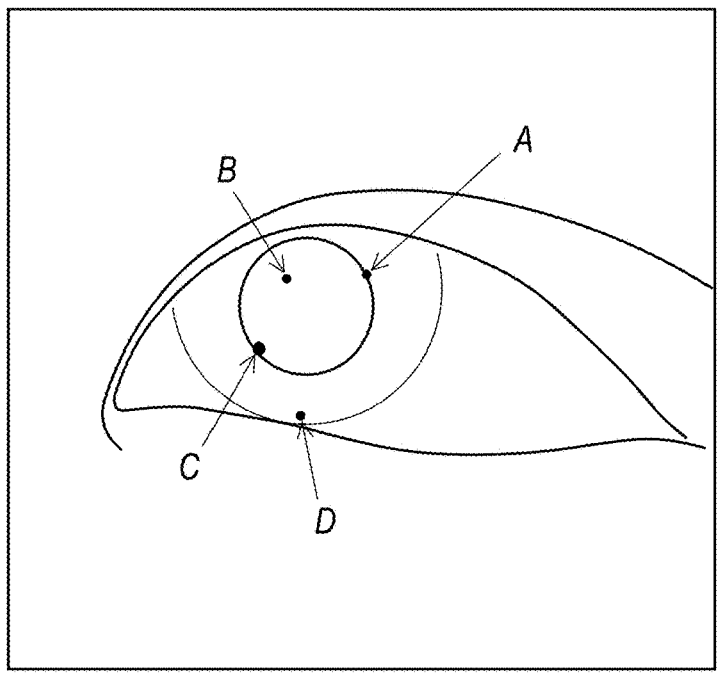
FIGS. 9A through 9C graphically illustrate glint-LED matching in image space, according to some embodiments.
Figure 9B:
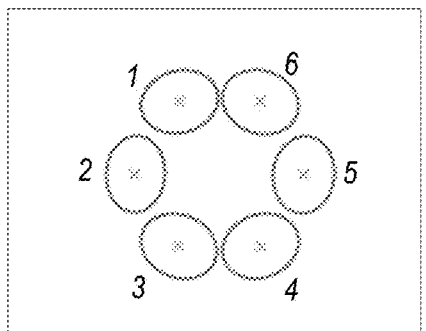
Figure 9C:
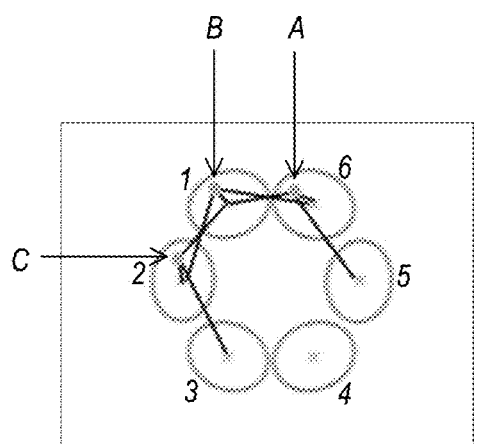

At 706, glint-LED matching is performed in image space. FIGS. 9A through 9C graphically illustrate glint-LED matching in image (2D) space, according to some embodiments. In this example, there is an array of six LEDs that emit light towards the user's eyes, resulting in glints as shown in FIG. 8A. FIG. 9A shows ground truth glint locations in in an example image of the user's eye as detected by the glint detection process. Four detected glints, referenced as glints A through D, are shown. FIG. 9B shows glint location distribution as determined by the user calibration process. The glint locations correspond to LEDs 1 through 6, starting at the upper left and going counter-clockwise. FIG. 9C illustrates finding the closest candidate LEDs for the detected glints, according to some embodiments. Referring to FIG. 9A, a subset (or all) of the glints may be selected as candidate glints for performing cornea center estimation based on a threshold distance to the detected pupil (glints that are too far away are rejected; glints A through C are selected in this example). A function (e.g., an energy function) may then be applied to the selected glints in the image with respect to the glint location distribution as shown in FIG. 9B to find the LEDs corresponding to the detected glints. In this example, the function determines that glint A corresponds to LED 6, glint B corresponds to LED 1, and glint C corresponds to LED 2.

Figure 11A:
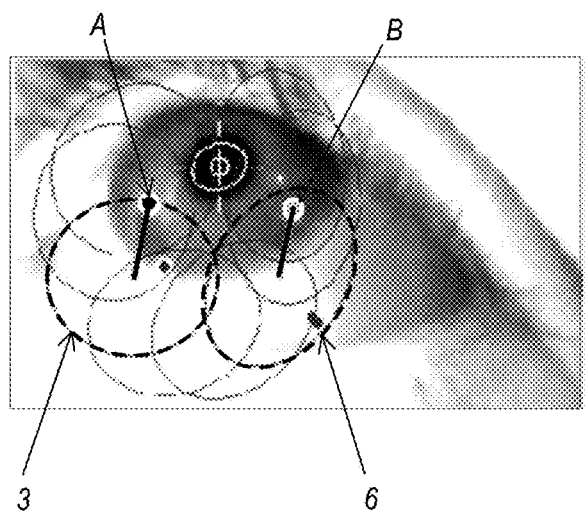
FIGS. 11A and 11B show example results of a glint matching in image space method compared to results when a glint geometric matching method is applied in 3D space to detect and correct potential mismatches using the glint matching in image space method.

However, there may be ambiguous situations when using the method at 706. Thus, it is possible that the glint-LED matching in image space performed at 706 may result in some mismatches; one or more of the glints may be matched to the wrong LEDs when based simply on the image information. FIG. 11A illustrates an example where there are ambiguities that result in glint-LED mismatches. Thus, at 708, the candidate glint-LED matches that were selected and matched to LEDs at 706 may be verified geometrically in 3D space.

Figure 7B:
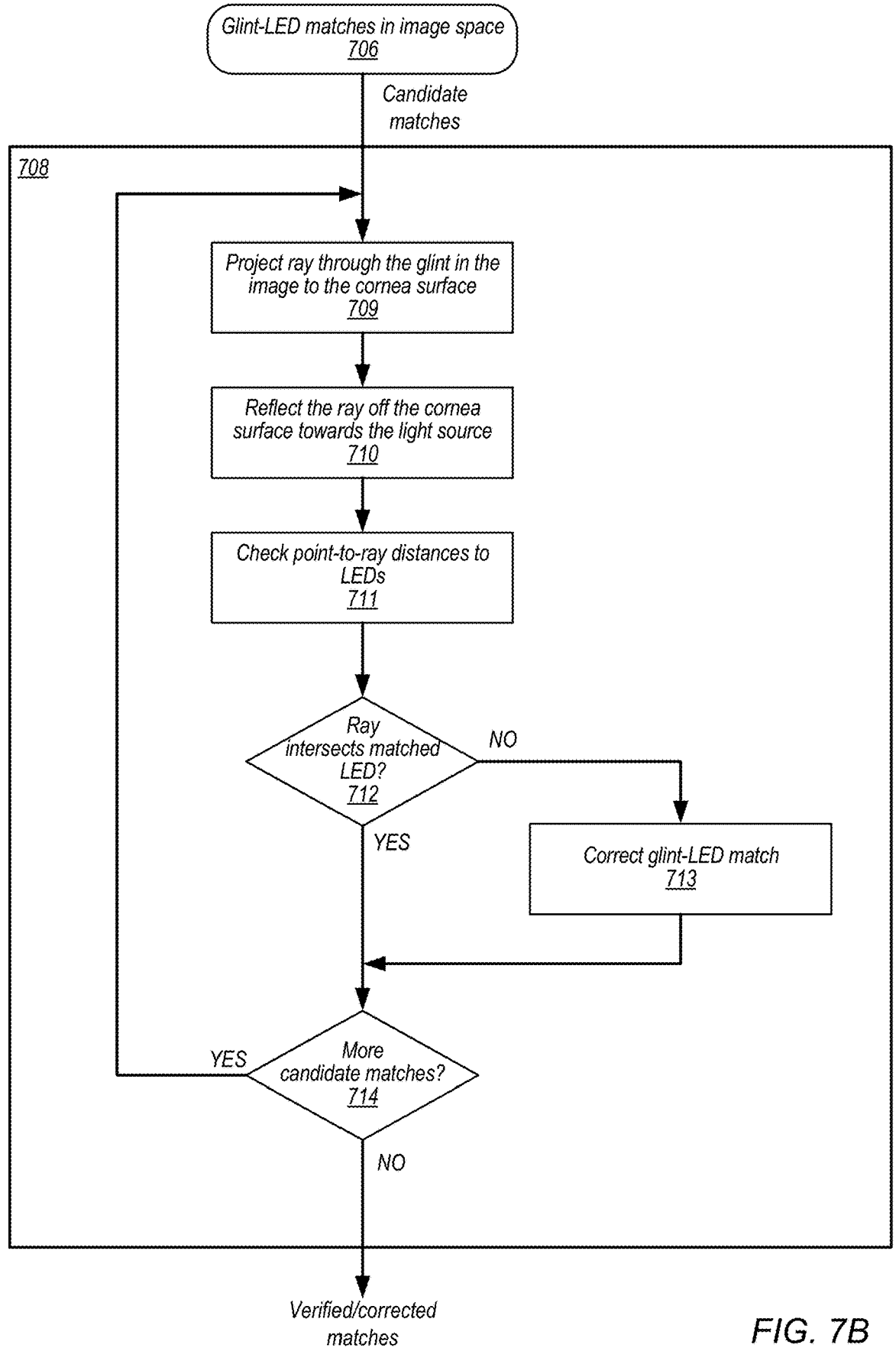
FIG. 7B is a flowchart of a method for verifying glint-LED matches in 3D space, according to some embodiments.
Figure 10:
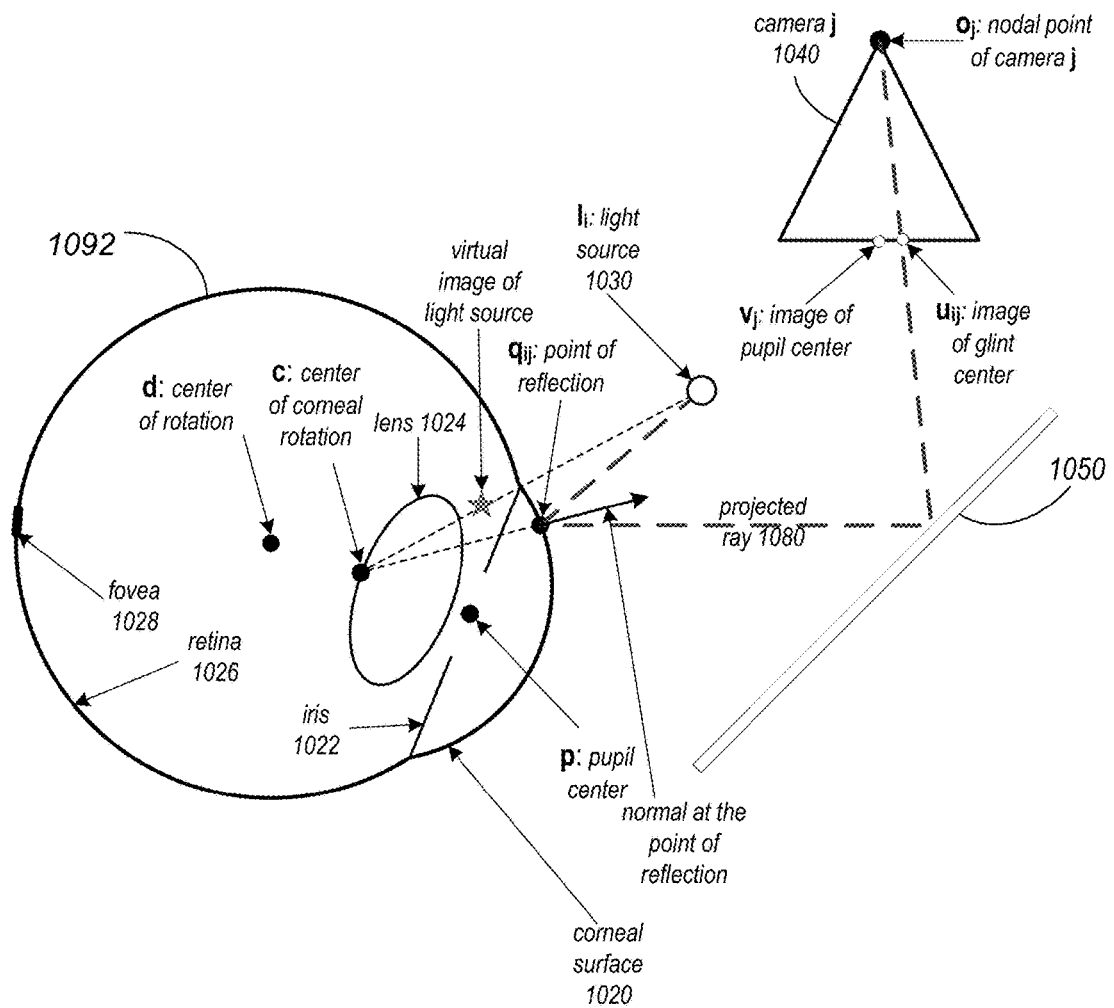
FIG. 10 graphically illustrates a method for verifying glint-LED matches in 3D space, according to some embodiments.

FIG. 7B is a flowchart of a method for verifying glint-LED matches in 3D space that may be used at element 708 of FIG. 7A in some embodiments. FIG. 10 graphically illustrates a method for verifying glint-LED matches in 3D space that may be used at element 708 of FIG. 7A in some embodiments. In this method, at 709 of FIG. 7B, a 3D geometric model of the gaze tracking system including the user's eye 1092, the camera 1040, the mirror 1050 (if present), and the LEDs (light source 1030) based on the user and device calibration data may be used to project or fire a virtual ray 1080 from the nodal point of the camera 1040 through the center of a candidate glint in the captured image ($u_{ij}$ in FIG. 10), off the mirror 1050 (if present) according to the law of reflection, and to a point of reflection ($q_{ij}$ in FIG. 10) on the cornea surface 1020. At 710 of FIG. 7B, the law of reflection may then be used to project the ray reflected off the cornea surface 1020 towards the light source 1030 (e.g., an array of LEDs).

If the glint-LED match is correct, then the projected ray should pass through or very near the LED that is matched to the glint being tested (e.g., within a specified threshold distance). At 711 of FIG. 7B, the point-to-ray distances between the LEDs and the ray are checked to determine which LED is closest to the projected ray. At 712 of FIG. 7B, if the projected ray passes through the currently matched LED or the currently matched LED is the closest LED to the projected ray, then the match may be accepted as correct and the method proceeds to element 714 of FIG. 7B. At 712 of FIG. 7B, if the projected ray passes through a different one of the LEDs or if one or more others of the LEDs are closer to the projected ray than the currently matched LED, then then the match is assumed to be incorrect and the method proceeds to element 713 of FIG. 7B where the glint is matched to the closest LED according to the point-to-ray distances; the method then proceeds to element 714 of FIG. 7B. In some embodiments, at 712, if the ray does not pass within a specified threshold distance of any of the LEDs, the glint may be discarded as a candidate. At 714 of FIG. 7B, if there are more candidate matches to be verified and possibly corrected, then the method returns to element 709. Using this method at element 708 of FIG. 7A, one or more of the candidate glint-LED matches generated at 706 of FIG. 7A may be corrected to associate the glints with correct ones of the LEDs.

At 718 of FIG. 7A, two (or more) glints may be selected from the candidate glints that were determined at 706 and refined at 708 for performing cornea center estimation. In some embodiments, two glints are sufficient to estimate the cornea center using the 3D geometric model of the gaze tracking system. In some embodiments, scores based on confidence of the results of elements 706 and 708 of FIG. 7A may be used to select the two glints for performing cornea center estimation, with the two best candidates based on the scores selected. For example, if there are three or more candidates, two candidates that have the shortest point-to-ray distances to the projected rays as described in reference to element 708 may be selected. Note that, if there are not enough candidate glints or if there are not enough candidate glints with scores that are high enough (over a specified threshold) to confidently use the glints to estimate the cornea center, then the current image may be rejected when detecting pupils and glints as indicated at 430 of FIG. 4 or when tracking pupils and glints as indicated at 450 of FIG. 4. If there are enough glints with high enough confidence in their scores to perform cornea center estimation, then the determined glint-LED matches are passed to the gaze estimation 720 process to be used in performing cornea center estimation.

Figure 11B:
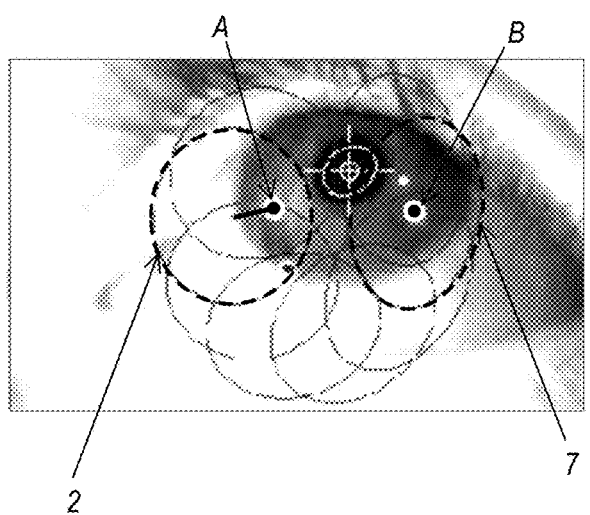

FIGS. 11A and 11B show example results of a glint matching in image space method (FIG. 11A) compared to results when a glint geometric matching method is applied in 3D space to detect and correct potential mismatches using the glint matching in image space method (FIG. 11B). The large ellipses represent a distribution of eight LEDs (LEDs 1 through 8, clockwise from the upper left) determined according to the device and user calibration data; centers of the ellipses correspond to the LED "points" used in the point-to-ray distance calculations described in reference to FIGS. 7A and 7B. The small circles represent candidate glints A and B in the image of the eye; the lines extending from the glints represent point-to-ray distances. In FIG. 7A, element 706 of FIG. 7A has matched glint A to LED 3, and glint B to LED 6. In FIG. 11B, the method described in reference to FIG. 7B has been applied to the candidate glints to correct glint A to instead be matched to LED 2 and glint B to instead be matched to LED 7.

Figure 12A:
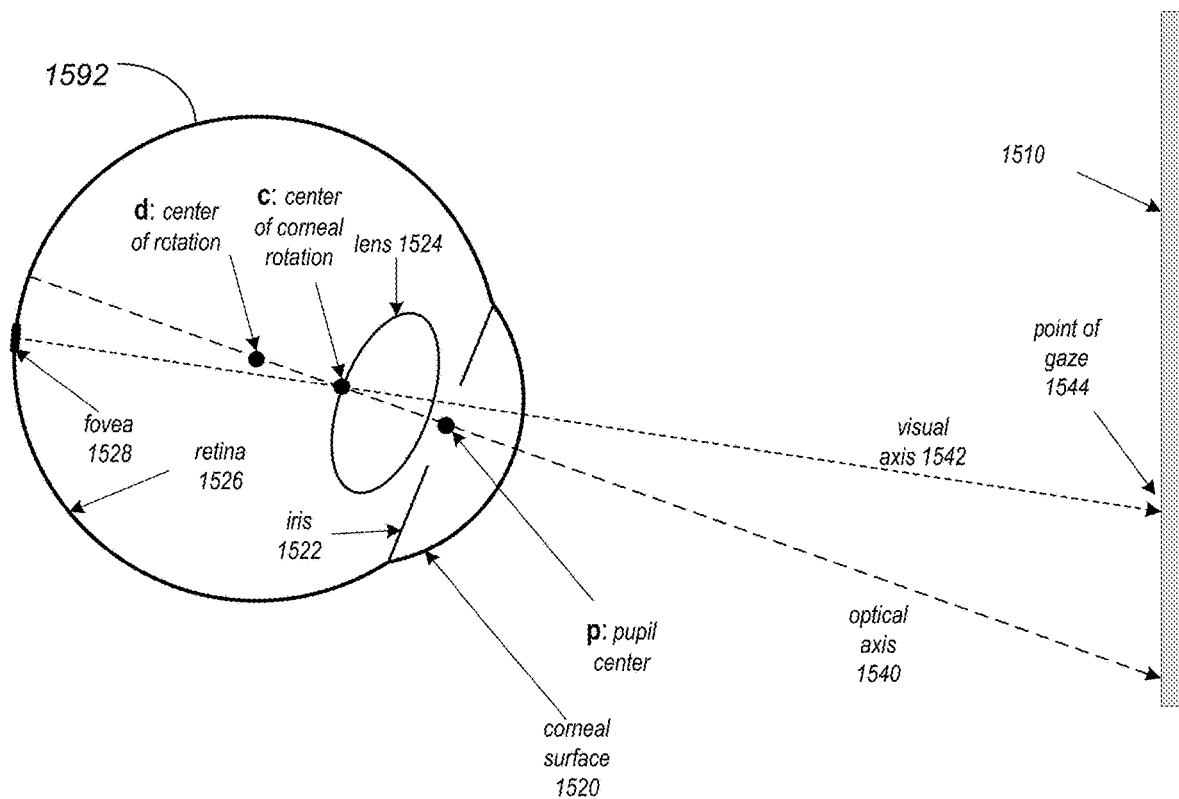
FIG. 12A illustrates a model of a human eye in relation to a display of an HMD, according to some embodiments.
Figure 12B:
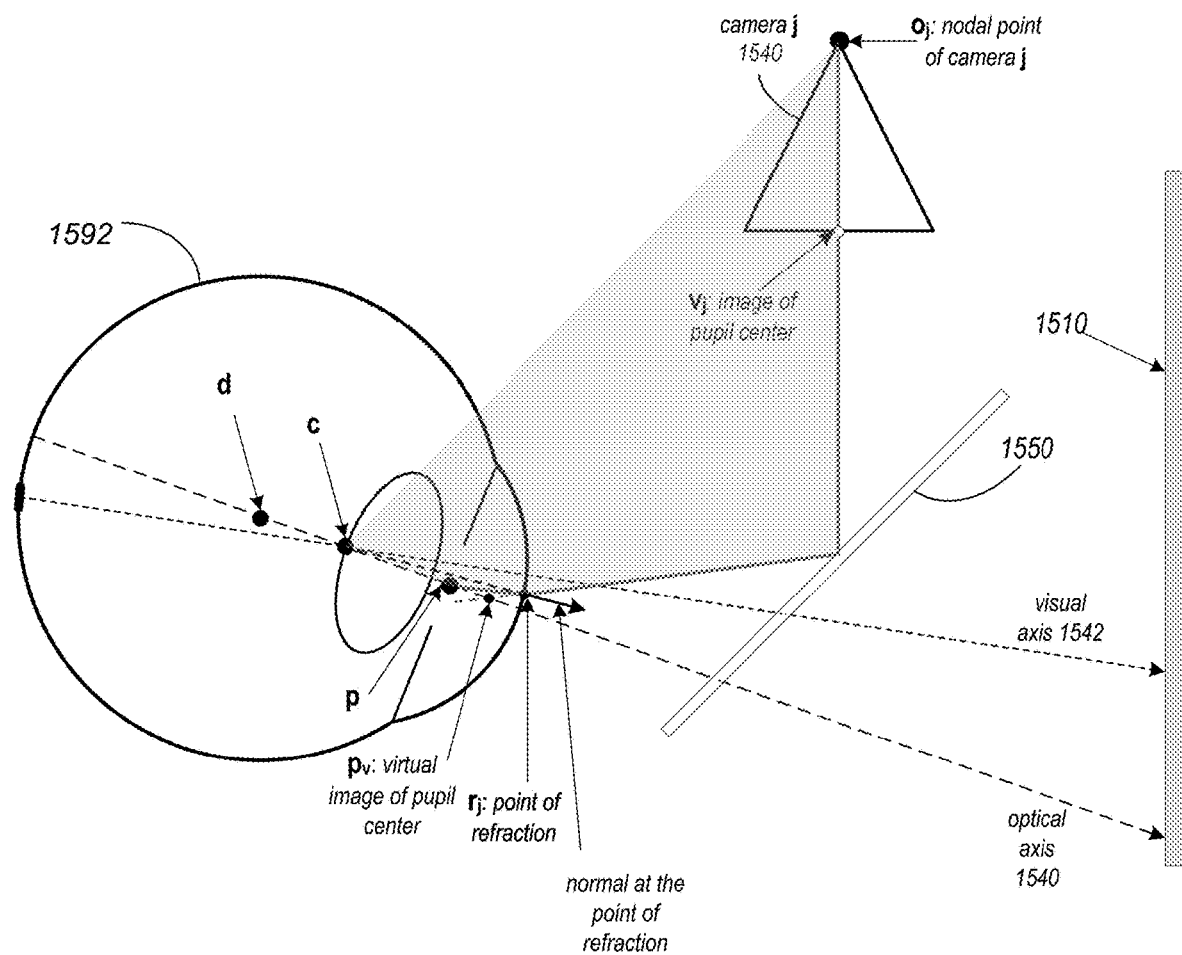
FIG. 12B illustrates a mathematical model for pupil center estimation, according to some embodiments.
Figure 12C:
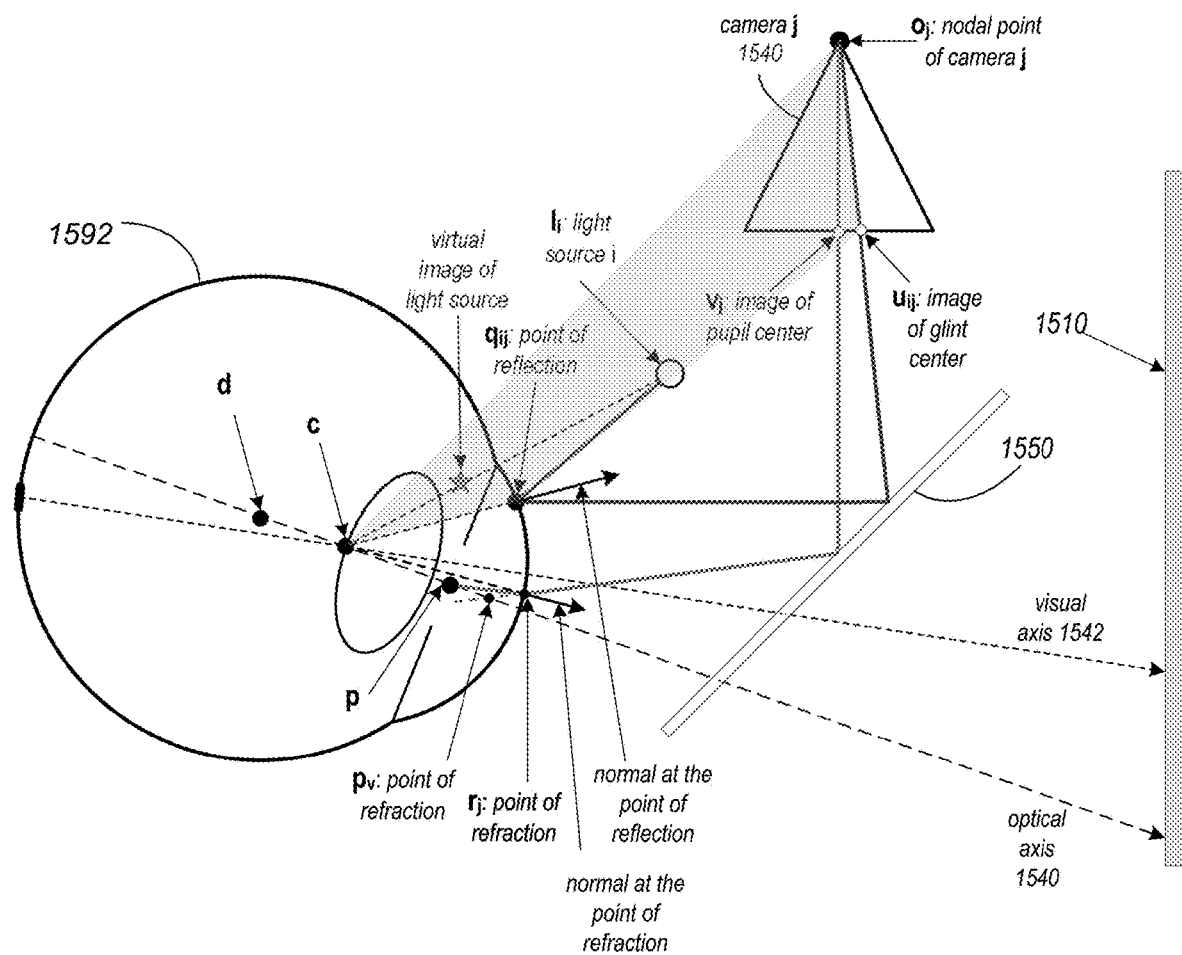
FIG. 12C illustrates a mathematical model for cornea center estimation, according to some embodiments.
Figure 13:
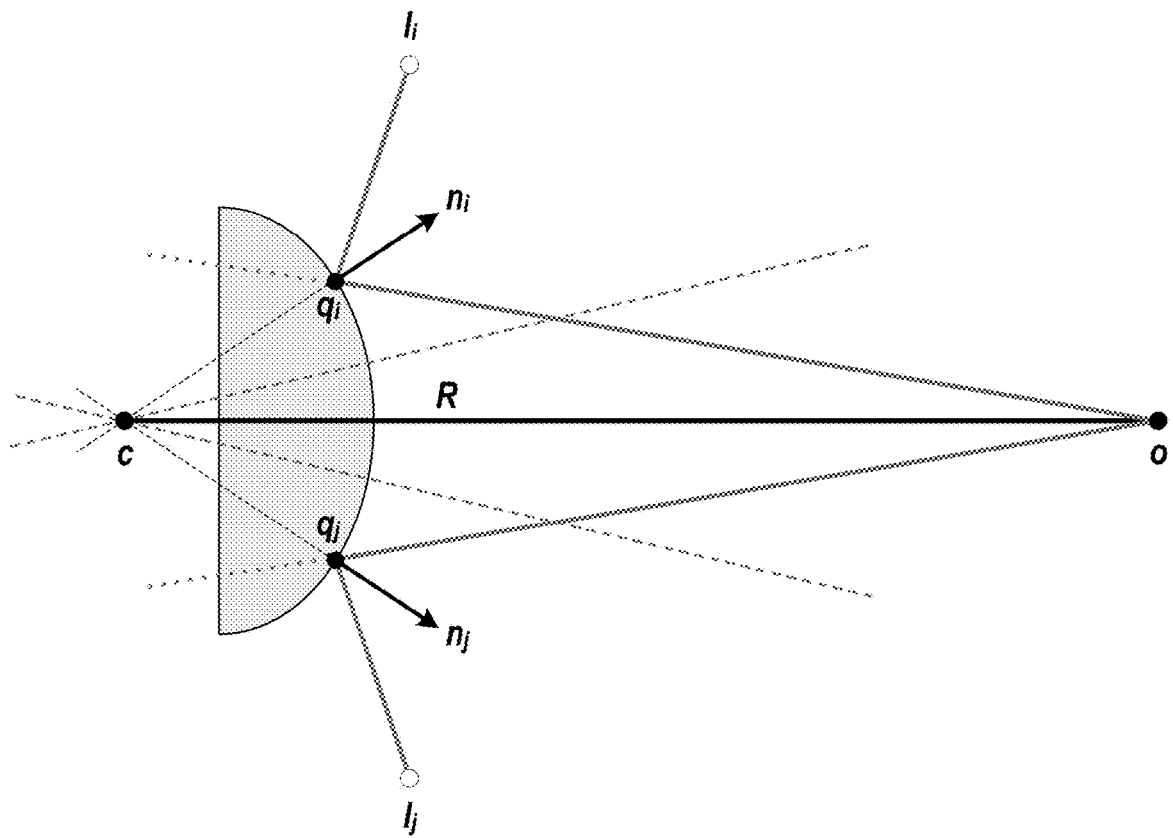
FIG. 13 further illustrates a mathematical model for cornea center estimation, according to some embodiments.

FIGS. 12A through 12C and 13 graphically illustrate a mathematical model for gaze estimation, according to some embodiments. FIG. 12A illustrates a model of a human eye 1592 in relation to a display 1510 of an HMD, according to some embodiments. The eye 1592 includes a corneal surface 1520, an iris 1522, a lens 1524, a retina 1526, and a fovea 1528. The optical axis 1540 of the eye passes through the pupil center p, the center of corneal rotation c, and the center of rotation of the eye d. The visual axis 1542 of the eye, however, passes through the center of the fovea 1528 and the center of corneal rotation c, and is thus a few degrees off the optical axis 1540. The visual axis 1542 intersects the display 1510 at the point of gaze.

FIG. 12B illustrates a mathematical model for pupil center estimation, according to some embodiments. FIG. 12B shows gaze tracking camera j 1240 and mirror 1540 of a gaze tracking system in relation to the eye 1592 and display 1510. Pupil center p, center of corneal rotation c, and center of rotation d are shown. $o_j$ is the nodal point of the camera j 1040, and camera j 1040 images the pupil center at $v_j$. $p_v$ is the virtual image of the pupil center p, and $r_j$ is the point of refraction for the pupil center at the corneal surface 1520. The normal at the point of refraction $r_j$ is shown.

According to the law of refraction:

1. p, $r_j$, c, and $o_j$ are coplanar. The coplanarity constraint is:

$$(r_j - o_j) \times (c - o_j) \cdot (p - o_j) = 0$$

2. The angles of incidence and refraction satisfy Snell's law:

$$n_1 \left\| \frac{p - r_j}{\|p - r_j\|} \times \frac{r_j - c}{R} \right\| = n_2 \left\| \frac{r_j - c}{R} \times \frac{o_j - r_j}{\|o_j - r_j\|} \right\|$$

FIGS. 12C and 13 illustrate a mathematical model for cornea center estimation, according to some embodiments. FIG. 12C shows light source $l_i$, gaze tracking camera j 1240 and mirror 1540 of a gaze tracking system in relation to the eye 1592 and display 1510. $u_{ij}$ is the glint center of light source $l_i$ in an image at camera j, and $q_{ij}$ is the point of reflection for light source $l_i$ on the cornea surface 1520.

According to the law of reflection:

1. $l_i$, $q_{ij}$, c, and $o_j$ are coplanar.
2. The angles of incidence and reflection are equal.

The glint position on the cornea surface ($q_{ij}$) can be calculated by:

$$q_{ij} = o_j + k_{q,ij} \frac{o_j - u_{ij}}{\|o_j - u_{ij}\|}, \text{ for some } k_{q,ij}$$

$$\|q_{ij} - c\| = R$$

The coplanarity constraint is:

$$(l_k - o_j) \times (u_{ij} - o_j) \cdot (c - o_j) = 0$$

where $(l_j - o_j) \times (u_{ij} - o_j)$ is the normal to the plane defined by $l_i$, $o_j$, and $u_{ij}$.

Cornea center c can be estimated by:

$$c = c_{ij} = q_{ij} - R \frac{\frac{l_i - q_{ij}}{\|l_i - q_{ij}\|} + \frac{o_j - q_{ij}}{\|o_j - q_{ij}\|}}{\left\| \frac{l_i - q_{ij}}{\|l_i - q_{ij}\|} + \frac{o_j - q_{ij}}{\|o_j - q_{ij}\|} \right\|}$$

Two matched glints provide sufficient constraints to estimate the cornea center. FIG. 13 shows two glint-LED matches, $q_i - l_i$ and $q_j - l_j$; o is the nodal point of the camera, c is the cornea center, and R is a ray from the nodal point o to the cornea center c. $n_i$ is the normal at the point of reflection $q_i$, and $n_n$ is the normal at the point of reflection $q_j$. To estimate the cornea center from the two glint-LED matches, $k_{q,1}$ and $k_{q,2}$ are found that minimize the distance between $c_1$ and $c_2$:

$$\min_{k_{q,1}, k_{q,2}} \|c_1(k_{q,1}, R) - c_2(k_{q,2}, R)\|^2$$

-continued $$c = \frac{c_1(k_{q,1}, R) + c_2(k_{q,2}, R)}{2}$$

FIG. 14 is a block diagram illustrating components of an example VR/AR system that includes a gaze tracking system as described herein, according to some embodiments. In some embodiments, a VR/AR system may include an HMD 2000 such as a headset, helmet, goggles, or glasses. HMD 2000 may implement any of various types of virtual reality projector technologies. For example, the HMD 2000 may include a VR projection system that includes a projector 2020 that displays frames including left and right images on screens or displays 2022A and 2022B that are viewed by a user through eye lenses 2220A and 2220B. The VR projection system may, for example, be a DLP (digital light processing), LCD (liquid crystal display), or LCoS (liquid crystal on silicon) technology projection system. To create a three-dimensional (3D) effect in a 3D virtual view, objects at different depths or distances in the two images may be shifted left or right as a function of the triangulation of distance, with nearer objects shifted more than more distant objects. Note that other types of projection systems may be used in some embodiments.

In some embodiments, HMD 2000 may include a controller 2030 that implements functionality of the VR/AR system and that generates frames (each frame including a left and right image) that are displayed by the projector 2020. In some embodiments, HMD 2000 may also include a memory 2032 that stores software (code 2034) of the VR/AR system that is executable by the controller 2030, as well as data 2038 that may be used by the VR/AR system when executing on the controller 2030. In some embodiments, HMD 2000 may also include one or more interfaces (e.g., a Bluetooth technology interface, USB interface, etc.) that communicate with an external device 2100 via a wired or wireless connection. In some embodiments, at least a part of the functionality described for the controller 2030 may be implemented by the external device 2100. External device 2100 may be or may include any type of computing system or computing device, such as a desktop computer, notebook or laptop computer, pad or tablet device, smartphone, hand-held computing device, game controller, game system, and so on.

In various embodiments, controller 2030 may be a uniprocessor system including one processor, or a multiprocessor system including several processors (e.g., two, four, eight, or another suitable number). Controller 2030 may include central processing units (CPUs) that implement any suitable instruction set architecture, and may execute instructions defined in that instruction set architecture. For example, in various embodiments controller 2030 may include general-purpose or embedded processors implementing any of a variety of instruction set architectures (ISAs), such as the x86, PowerPC, SPARC, RISC, or MIPS ISAs, or any other suitable ISA. In multiprocessor systems, each of the processors may commonly, but not necessarily, implement the same ISA. Controller 2030 may employ any microarchitecture, including scalar, superscalar, pipelined, superpipelined, out of order, in order, speculative, non-speculative, etc., or combinations thereof. Controller 2030 may include circuitry to implement microcoding techniques. Controller 2030 may include one or more processing cores that each execute instructions. Controller 2030 may include one or more levels of caches, which may employ any size and any configuration (set associative, direct mapped, etc.).

In some embodiments, controller 2030 may include at least one graphics processing unit (GPU), which may include any suitable graphics processing circuitry. Generally, a GPU may render objects to be displayed into a frame buffer (e.g., one that includes pixel data for an entire frame). A GPU may include one or more graphics processors that may execute graphics software to perform a part or all of the graphics operation, or hardware acceleration of certain graphics operations. In some embodiments, controller 2030 may include one or more other components for processing and rendering video and/or images, for example image signal processors (ISPs), coder/decoders (codecs), etc.

Memory 2032 may include any type of memory, such as dynamic random access memory (DRAM), synchronous DRAM (SDRAM), double data rate (DDR, DDR2, DDR3, etc.) SDRAM (including mobile versions of the SDRAMs such as mDDR3, etc., or low power versions of the SDRAMs such as LPDDR2, etc.), RAMBUS DRAM (RDRAM), static RAM (SRAM), etc. In some embodiments, one or more memory devices may be coupled onto a circuit board to form memory modules such as single inline memory modules (SIMMs), dual inline memory modules (DIMMs), etc. Alternatively, the devices may be mounted with an integrated circuit implementing system in a chip-on-chip configuration, a package-on-package configuration, or a multi-chip module configuration.

In some embodiments, the HMD 2000 may include one or more external cameras 2050 that capture video of the user's environment for AR applications. In some embodiments, the HMD 2000 may render and display frames to provide an augmented or mixed reality (AR) view for the user at least in part according to camera 2050 inputs. The AR view may include renderings of the user's environment, including renderings of real objects in the user's environment, based on video captured by one or more video cameras 2050 that capture high-quality, high-resolution video of the user's environment for display. In some embodiments, the cameras 2050 may be equipped with autofocus mechanisms. While not shown, in some embodiments, the HMD 2000 may also include one or more sensors that collect information about the user's environment and actions (depth information, lighting information, user motions and gestures, etc.). The cameras 2050 and sensors may provide the information to the controller 2030 of the VR/AR system.

As shown in FIG. 14, HMD 2000 may be positioned on the user's head such that the displays 2022A and 2022B and eye lenses 2220A and 2220B are disposed in front of the user's eyes 2292A and 2292B. IR or NIR light sources 2230A and 2230B (e.g., IR or NIR LEDs) may be positioned in the HMD 2000 (e.g., around the eye lenses 2220A and 2220B, or elsewhere in the HMD 2000) to illuminate the user's eyes 2292A and 2292B with IR or NIR light. Eye tracking cameras 2240A and 2240B (e.g., IR or NIR cameras, for example 400×400 pixel count cameras) are located at each side of the user's face, for example at or near the user's cheek bones. Note that the location of eye tracking cameras 2240A and 2240B is given by way of example, and is not intended to be limiting. In some embodiments, there may be a single eye tracking camera 2240 located on each side of the user's face. In some embodiments there may be two or more eye tracking cameras 2240 on each side of the user's face. For example, in some embodiments, a wide-angle camera 2240 and a narrower-angle camera 2240 may be used on each side of the user's face. A portion of IR or NIR light emitted by light sources 2230A and 2230B reflects off the user's eyes 2292A and 2292B either directly to respective eye tracking cameras 2240A and 2240B or via mirrors 2250A and 2250B located between the user's eyes 2292 and the displays 2022, and is captured by the eye tracking cameras 2240A and 2240B to image the user's eyes 2292A and 2292B. Gaze tracking information captured by the cameras 2240A and 2240B may be provided to the controller 2030. The controller 2030 may analyze the gaze tracking information (e.g., images of the user's eyes 2292A and 2292B) to determine gaze direction, eye position and movement, pupil dilation, or other characteristics of the eyes 2292A and 2292B.

The gaze tracking information obtained and analyzed by the controller 2030 may be used by the controller in performing various VR or AR system functions. For example, the point of gaze on the displays 2022A and 2022B may be estimated from images captured by the eye tracking cameras 2240A and 2240B using the glint-assisted methods described in reference to FIGS. 1 through 13. The estimated point of gaze may, for example, be used to render virtual content differently based on the determined direction of the user's gaze. For example, the controller 2030 may generate virtual content at a higher resolution in a foveal region determined from the user's current gaze direction than in peripheral regions. As another example, the controller 2030 may position or move virtual content in the view based at least in part on the user's current gaze direction. As another example, the controller 2030 may display particular virtual content in the view based at least in part on the user's current gaze direction. As another example, the estimated point of gaze may be used to direct the autofocus mechanism of the external cameras 2050 to focus in the direction of the user's gaze so that the external cameras 2050 focus on objects in the environment at which the user is currently looking. As another example, the estimated point of gaze may be used in directing the eye lenses 2220 to adjust focus for a displayed virtual object that the user is looking at so that the virtual object appears to the user at the correct vergence distance. Other applications of the gaze tracking information may include, but are not limited to, gaze-based interaction with content shown on the displays 2022A and 2022B and creation of eye image animations used for avatars in a VR or AR environment.

Embodiments of the HMD 2000 as illustrated in FIG. 14 may also be used in virtual reality (VR) applications to provide VR views to the user. In these embodiments, the controller 2030 of the HMD 2000 may render or obtain virtual reality (VR) frames that include virtual content, and the rendered frames may be provided to the projector 2020 of the HMD 2000 for display to displays 2022A and 2022B. In some embodiments, for VR applications, the controller 2030 may obtain distance information for virtual content to be displayed on the display panels 2022, and may use this distance information to direct the eye lenses 2220 to adjust focus according to the distance of virtual content that the user is currently looking at according to the gaze tracking information.

Embodiments of the HMD 2000 as illustrated in FIG. 14 may also be used to play back recorded AR or VR sessions. In some embodiments, the point of gaze estimated using the glint-assisted gaze tracking methods as described herein may be used when playing back recorded session. As an example use case, the estimate point of gaze may be used in adjusting focus of the eye lenses of the HMD to provide correct vergence for recorded content being played back that the user is currently looking at. In some embodiments, for example, the controller 2030 may record video of a session to an external device 2010. Focus information may be recorded with the video. During playback of the video to HMD 2000, the gaze tracking information collected by the eye tracking cameras 2240 may be used to determine the direction of the user's gaze using the methods described herein, and the gaze direction or point of gaze on the display can be used to determine depth at the place where the user's gaze is currently directed. The eye lenses 2220 can then be adjusted to provide the appropriate vergence for the part of the scene that the user is looking at.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

What is claimed is:

1. A head-mounted display (HMD) that displays visual content for viewing by a user, wherein the HMD comprises:
    a display;
    a plurality of light sources that emit light towards a user's eye;
    a camera that captures images of the user's eye; and
    a controller comprising one or more processors, wherein the controller is configured to:
        detect two or more glints in an image of the user's eye captured by the camera, wherein each glint is a reflection of one of the light sources on a cornea surface of the user's eye;
        match the detected glints to corresponding ones of the light sources to generate two or more glint-light source matches;
        verify the glint-light source matches geometrically in three-dimensional (3D) space using 3D geometric models of components of the HMD and of the user's eye; and
        estimate a cornea center of the user's eye based on two of the glint-light source matches and the 3D geometric models of components of the HMD and of the user's eye.

2. The HMD as recited in claim 1, wherein the controller is further configured to:
    detect a pupil contour of the user's eye in the image of the user's eye; and
    estimate a pupil center of the user's eye based on the pupil contour and the 3D geometric models of the components of the HMD and of the user's eye.

3. The HMD as recited in claim 2, wherein the controller is further configured to:
    reconstruct an optical axis of the user's eye based on the cornea center and the pupil center, wherein the optical axis passes through the cornea center and the pupil center; and
    reconstruct a visual axis of the user's eye based on the optical axis and the 3D geometric model of the user's eye, wherein the visual axis passes through a fovea of the user's eye and the pupil center.

4. The HMD as recited in claim 3, wherein the controller is further configured to determine a point of gaze on the display based on the visual axis and the 3D geometric models of the components of the HMD.

5. The HMD as recited in claim 1, wherein, to match the detected glints to corresponding ones of the light sources to generate two or more glint-light source matches, the controller is configured to:
    match the detected glints to corresponding ones of the light sources in image space by applying an energy function to the glints with respect to with respect to a glint location distribution determined by a user calibration process.

6. The HMD as recited in claim 1, wherein, to verify a glint-light source match geometrically in 3D space using the 3D geometric models of the components of the HMD and of the user's eye, the controller is configured to:
    project a ray from a nodal point of the camera through the glint to a cornea surface of the eye;
    reflect the ray off the cornea surface according to the law of reflection towards the plurality of light sources;
    determine point-to-ray distances of the ray with respect to the plurality of light sources;
    if the projected ray passes through the currently matched light source or the currently matched light source is the closest light source to the projected ray, accept the glint-light source match; and
    if the projected ray passes through another one of the light sources or the other light source is closer to the projected ray than the currently matched light source, match the glint to the other light source.

7. The HMD as recited in claim 6, wherein the controller is configured to reject the glint-light source match if none of the light sources are within a threshold distance to the projected ray.

8. The HMD as recited in claim 1, wherein the 3D geometric models of the components of the HMD are based on parameters of the components determined by a device-specific calibration process, and wherein the 3D model of the user's eye is based on parameters of the user's eye determined by a user-specific calibration process.

9. The HMD as recited in claim 1, further comprising an optical lens positioned between the display and the user's eye, wherein the light sources are infrared or near-infrared light-emitting diodes (LEDs) arranged in a pattern around the optical lens.

10. The HMD as recited in claim 1, further comprising a hot mirror positioned between the display and the user's eye, wherein the camera is pointed towards the mirror and captures the images of the user's eye reflected off the mirror.

11. A method, comprising:
    performing, by a controller of a head-mounted display (HMD):
        obtaining an image of a user's eye captured by an eye tracking camera of the HMD;
        detecting two or more glints in the image of the user's eye captured by the camera, wherein each glint is a reflection of one of a plurality of infrared or near-infrared light-emitting diodes (LEDs) of the HMD on a cornea surface of the user's eye;

matching the detected glints to corresponding ones of the LEDs to generate two or more glint-LED matches;

verifying the glint-LED matches geometrically in three dimensional (3D) space using 3D geometric models of components of the HMD and of the user's eye; and estimating a cornea center of the user's eye based on two of the glint-LED matches and the 3D geometric models of components of the HMD and of the user's eye.

12. The method as recited in claim 11, further comprising:

detecting a pupil contour of the user's eye in the image of the user's eye; and estimating a pupil center of the user's eye based on the pupil contour and the 3D geometric models of the components of the HMD and of the user's eye.

13. The method as recited in claim 12, further comprising:

reconstructing an optical axis of the user's eye based on the cornea center and the pupil center, wherein the optical axis passes through the cornea center and the pupil center; and reconstructing a visual axis of the user's eye based on the optical axis and the 3D geometric model of the user's eye, wherein the visual axis passes through a fovea of the user's eye and the pupil center.

14. The method as recited in claim 13, further comprising determining a point of gaze on the display based on the visual axis and the 3D geometric models of the components of the HMD.

15. The method as recited in claim 11, wherein matching the detected glints to corresponding ones of the LEDs to generate two or more glint-LED matches comprises:

matching the detected glints to corresponding ones of the LEDs in image space by applying an energy function to the glints with respect to with respect to a glint location distribution determined by a user calibration process.

16. The method as recited in claim 11, wherein verifying a glint-LED match geometrically in 3D space using the 3D geometric models of the components of the HMD and of the user's eye comprises:

projecting a ray from a nodal point of the camera through the glint to a cornea surface of the eye;

reflecting the ray off the cornea surface according to the law of reflection towards the plurality of LEDs;

determining point-to-ray distances of the ray with respect to the plurality of LEDs;

if the projected ray passes through the currently matched LED or the currently matched LED is the closest LED to the projected ray, accepting the glint-LED match; and if the projected ray passes through another one of the LEDs or the other LED is closer to the projected ray than the currently matched LED, matching the glint to the other LED.

17. A method, comprising:

performing a device-specific calibration process on a head-mounted display (HMD) to determine parameters of a gaze tracking system in the HMD, wherein the gaze tracking system includes a plurality of light-emitting diodes (LEDs) that emit light towards a user's eye, and a camera that captures images of the user's eye;

performing a user-specific calibration process on the HMD to determine parameters of the user's eye;

capturing, by the camera, an image of the user's eye;

based at least in part on the gaze tracking system not being in a tracking state, detecting glints and a pupil ellipse in the image, wherein each glint is a reflection of one of the LEDs on a cornea surface of the user's eye;

based at least in part on the gaze tracking system being in the tracking state, tracking the glints and the pupil ellipse in the image based on glint and pupil information from a previously captured and processed image of the user's eye; and matching the glints in the image to corresponding ones of the LEDs to generate two or more glint-LED matches;

verifying the glint-LED matches geometrically in three dimensional (3D) space using a 3D geometric model based on the parameters of the gaze tracking system and the parameters of the user's eye; and estimating a cornea center of the user's eye based on two of the glint-LED matches, the parameters of the gaze tracking system, and the parameters of the user's eye.

18. The method as recited in claim 17, further comprising:

estimating a pupil center of the user's eye based on the pupil ellipse, the parameters of the gaze tracking system, and the parameters of the user's eye;

reconstructing an optical axis of the user's eye based on the cornea center and the pupil center, wherein the optical axis passes through the cornea center and the pupil center; and reconstructing a visual axis of the user's eye based on the optical axis and the parameters of the user's eye, wherein the visual axis passes through a fovea of the user's eye and the pupil center; and determining a point of gaze on a display of the HMD based on the visual axis and the parameters of the gaze tracking system.

19. The method as recited in claim 17, wherein matching the detected glints to corresponding ones of the LEDs to generate two or more glint-LED matches comprises:

matching the detected glints to corresponding ones of the LEDs in image space by applying an energy function to the glints with respect to with respect to a glint location distribution determined by the user calibration process.

20. The method as recited in claim 17, wherein verifying a glint-LED match geometrically in 3D space using the 3D geometric model comprises:

projecting a ray from a nodal point of the camera through the glint to a cornea surface of the eye;

reflecting the ray off the cornea surface according to the law of reflection towards the plurality of LEDs;

determining point-to-ray distances of the ray with respect to the plurality of LEDs;

if the projected ray passes through the currently matched LED or the currently matched LED is the closest LED to the projected ray, accepting the glint-LED match; and if the projected ray passes through another one of the LEDs or the other LED is closer to the projected ray than the currently matched LED, matching the glint to the other LED.

* * * * *